July 5, 1949.    K. A. KAIL    2,475,355
FLAPS AND RETRACTABLE LANDING GEAR SIMULATING
MEANS FOR GROUNDED AVIATION TRAINER
Filed Jan. 30, 1946    7 Sheets-Sheet 1
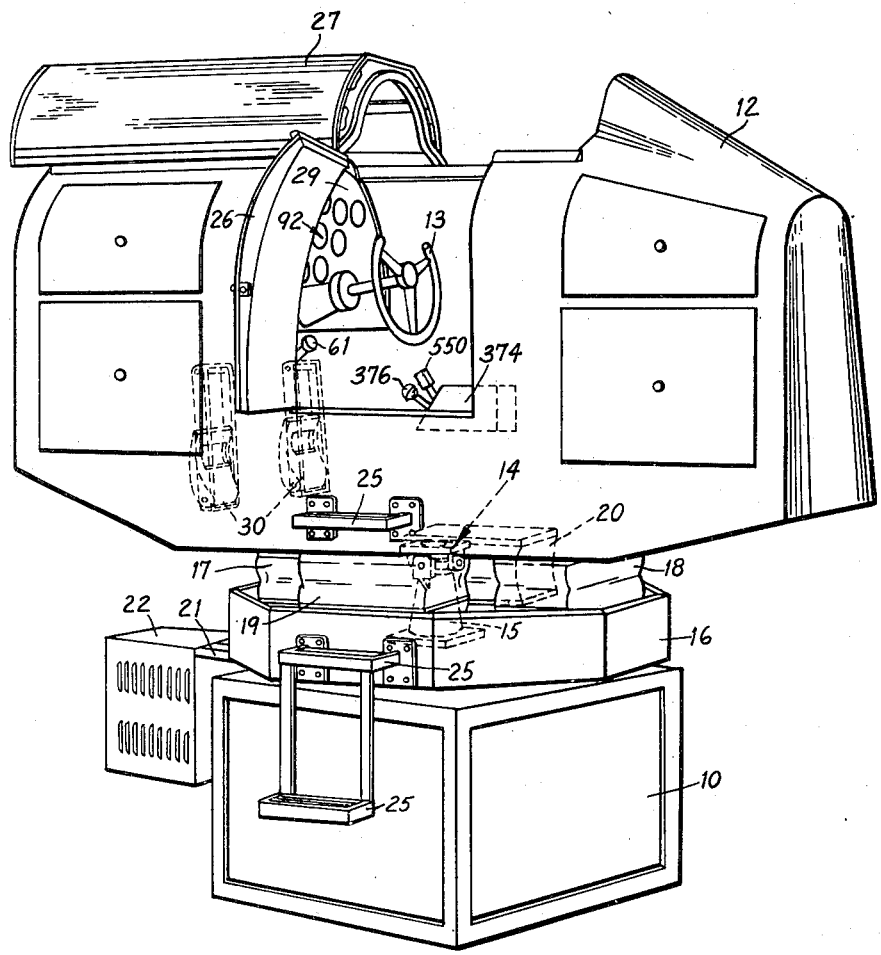
FIG. I
KARL A. KAIL
*INVENTOR.*
BY
ATTORNEYS July 5, 1949.　　　　　K. A. KAIL　　　　　2,475,355
FLAPS AND RETRACTABLE LANDING GEAR SIMULATING
MEANS FOR GROUNDED AVIATION TRAINER
Filed Jan. 30, 1946　　　　　　　　　　　7 Sheets-Sheet 2

KARL A. KAIL
*INVENTOR.*

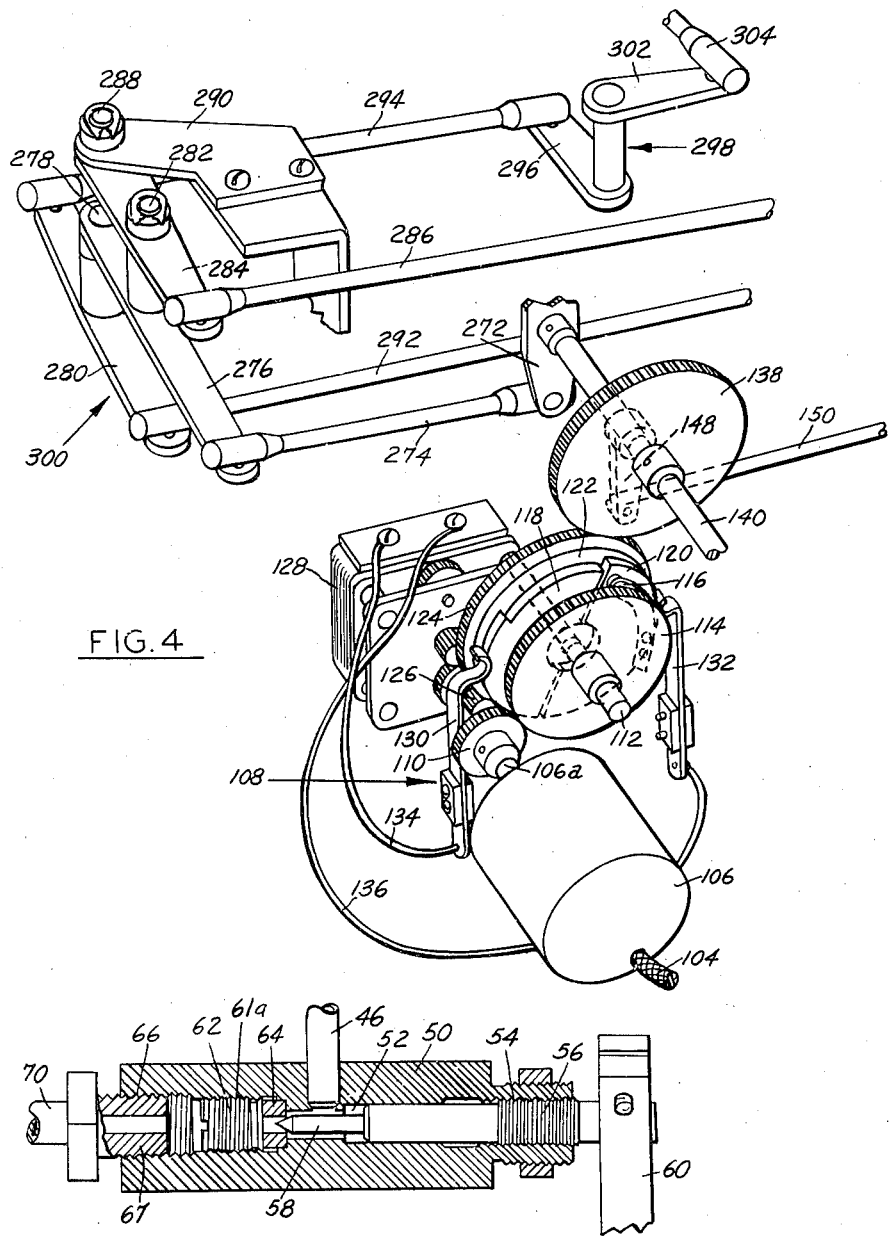

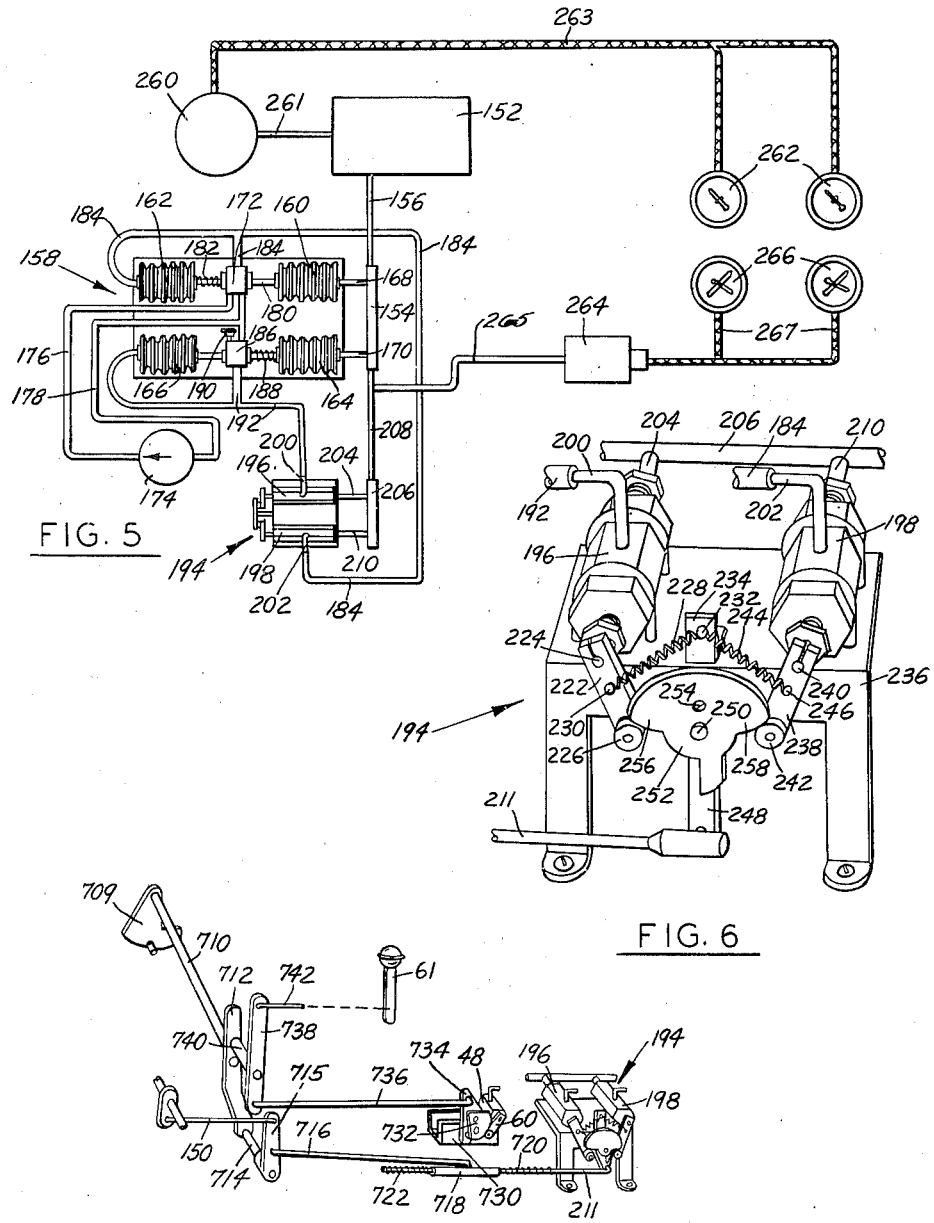

July 5, 1949.                K. A. KAIL                2,475,355
         FLAPS AND RETRACTABLE LANDING GEAR SIMULATING
               MEANS FOR GROUNDED AVIATION TRAINER
Filed Jan. 30, 1946                          7 Sheets-Sheet 5
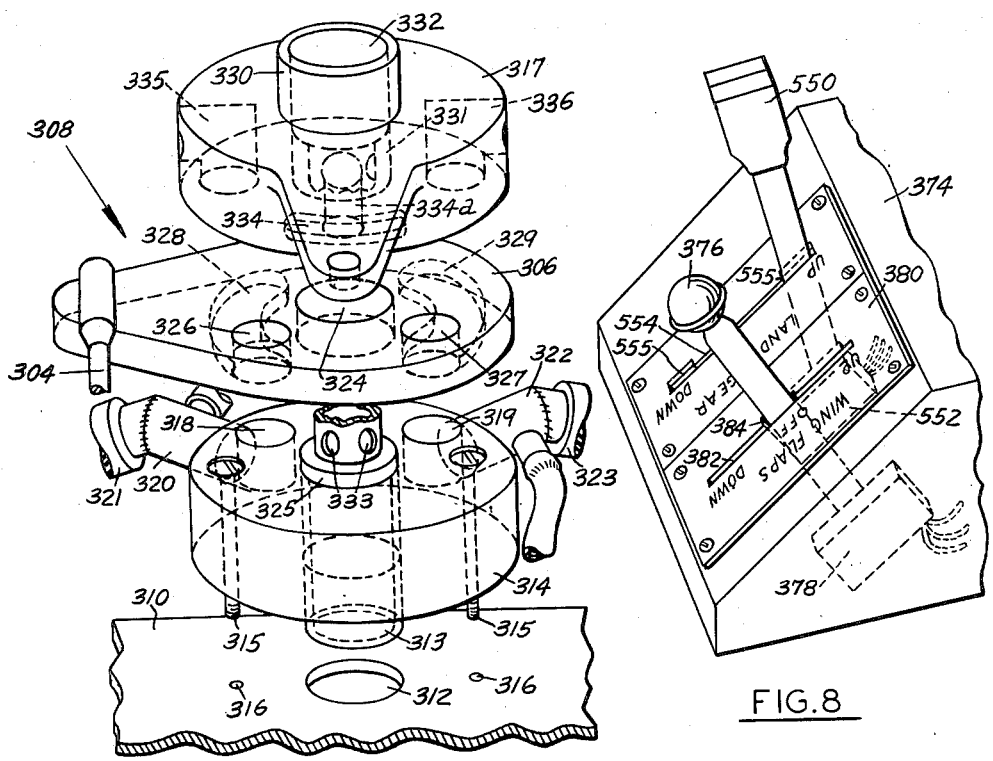
FIG. 7
FIG. 8
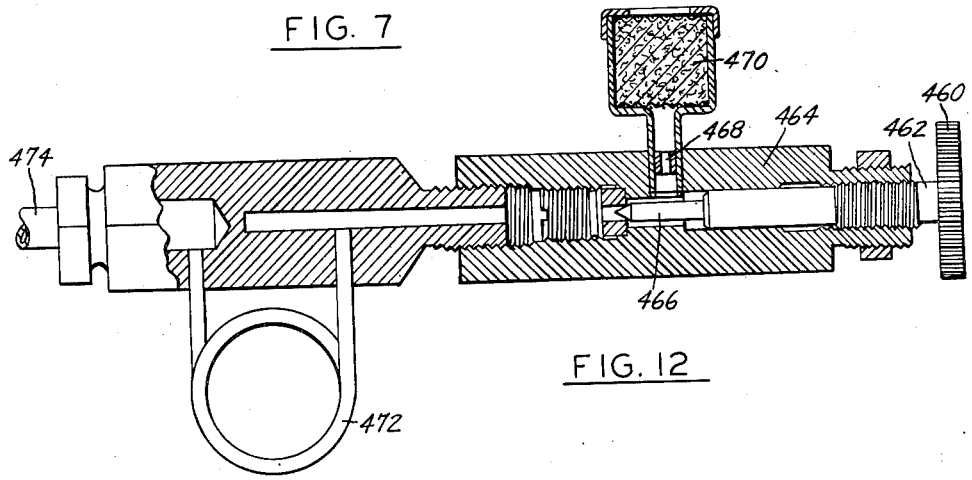
FIG. 12
KARL A. KAIL
*INVENTOR.*
BY
ATTORNEYS July 5, 1949.  K. A. KAIL  2,475,355
FLAPS AND RETRACTABLE LANDING GEAR SIMULATING
MEANS FOR GROUNDED AVIATION TRAINER
Filed Jan. 30, 1946  7 Sheets-Sheet 6
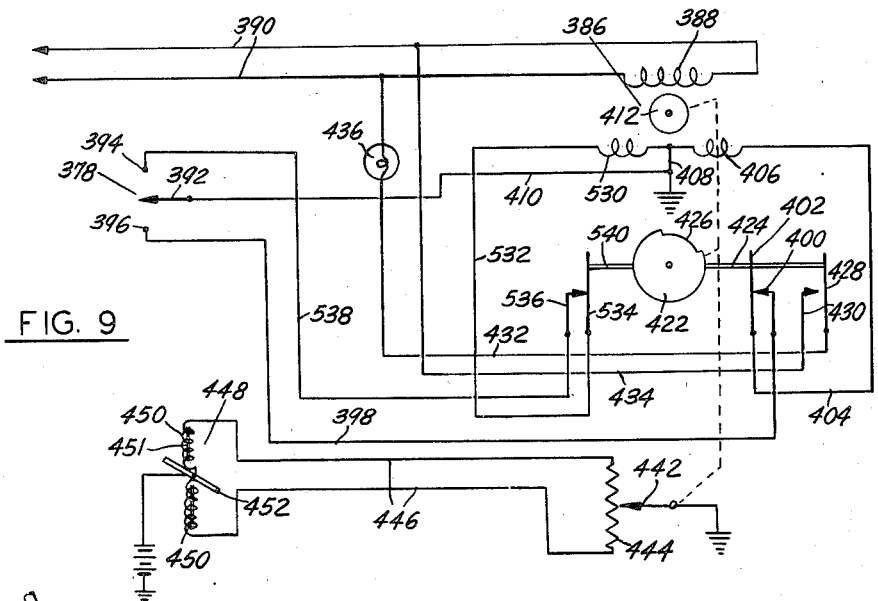
FIG. 9
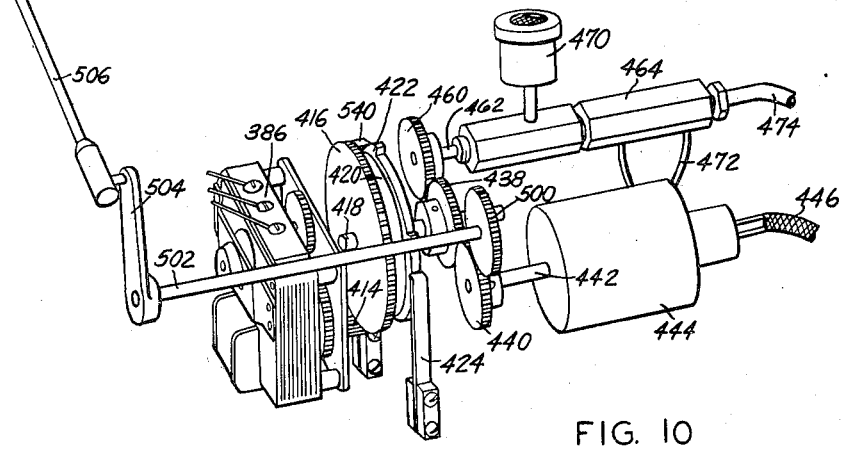
FIG. 10
FIG. 11
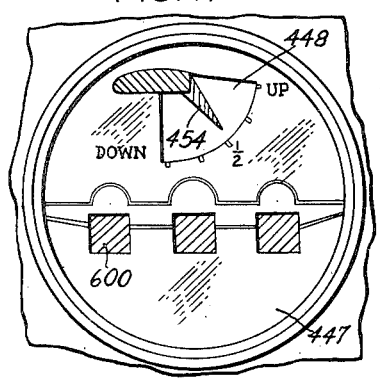
FIG. 11A
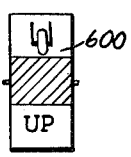
KARL A. KAIL
INVENTOR.
BY  *Donald T. Heller*
    *Philip S. Hopkins*
    ATTORNEYS Patented July 5, 1949

2,475,355

UNITED STATES PATENT OFFICE 2,475,355

FLAPS AND RETRACTABLE LANDING GEAR SIMULATING MEANS FOR GROUNDED AVIATION TRAINER

Karl A. Kail, Montrose, Pa., assignor to Link Aviation, Inc., a corporation of New York Application January 30, 1946, Serial No. 644,380

16 Claims. (Cl. 35—12)

This invention relates generally to improvements in grounded aviation trainers, and more particularly aims to provide in grounded aviation trainers means whereby the functioning and effects of wing flaps and retractible landing gear of real aircraft may be simulated.

The invention disclosed and claimed herein will be illustrated in connection with aviation trainers of the type disclosed in U. S. Patents 1,825,462 and 2,099,857 issued to Edwin A. Link. These trainers have been widely adopted for teaching students the art of flying, and particularly of instrument flight.

In these trainers, as is well known, there are provided engine control simulating means, such as a throttle lever, rudder pedals and a wheel or stick control, as well as all of the flight instruments normally carried by actual planes, including an air speed indicator, vertical speed indicator, altimeter, compass, artificial horizon, etc. The movements of the fuselage are primarily controlled by rudder pedals and wheel or stick, and the instruments are controlled by the throttle lever and fuselage movements.

However, so far as is known, means have never been provided for simulating the operation of the wing flaps and retractible landing gear of actual aircraft. Considering first the wing flaps of real aircraft, a control lever is provided in the fuselage with which the pilot may control the position of the wing flaps, the primary purpose of which is to reduce the stalling speed of the aircraft by increasing the lift of the wings, so that the aircraft may be landed at a reduced air speed. Accordingly, when the flaps are lowered the air speed of the plane drops, a tendency of the plane to change its vertical speed is produced, and the attitude of the plane is usually changed. Raising of the flaps causes the plane to resume its normal flight. An indicator is provided to show the instant position of the flaps. It is a principal object of this invention to provide, in a grounded aviation trainer, means whereby the operation and effects of the lowering and raising of the flaps of real aircraft may be simulated.

Insofar as the operation and effects of retractible landing gear are concerned, the lowering of the landing gear results in a decrease in air speed of the plane and a lowering of the nose of the plane. Raising of the landing gear results in opposite effects. Also, an indicator is provided to show whether the landing gear is up or down. It is another principal object of this invention to provide in a grounded aviation trainer means whereby the operation and effects of retractible landing gear may be simulated.

Other objects of this invention will become apparent as the description proceeds.

In order that the nature of this invention may be better understood, reference is made to the accompanying drawings, in which Fig. 1 is a general view of trainers of the type in connection with which this invention will be illustrated.

Fig. 3 is a cross-sectional view of the air speed regulator valve.

Fig. 4 is a detailed perspective view of the air speed follow-up unit and controlled mechanism.

Fig. 5 is a schematic view of one type of altitude system which may be combined with this invention.

Fig. 6 is a detailed exterior view of the climb-dive valve assembly.

Fig. 6A is a detailed perspective view of a portion of the apparatus used in trainers of the type disclosed herein for introducing fuselage pitch effects.

Fig. 7 is an exploded view of the elevator valve.

Fig. 8 is a general view of the wing flaps and landing gear control box and levers.

Fig. 9 is an electrical diagram of the flaps unit.

Fig. 10 is a perspective drawing of the mechanical part of the flaps unit.

Fig. 11 is a front view of the flaps and landing gear indicator.

Fig. 11A is a detailed view of the movable element of the landing gear indicator.

Fig. 12 is a cross-sectional view of the flaps valve.

Figure 1A:
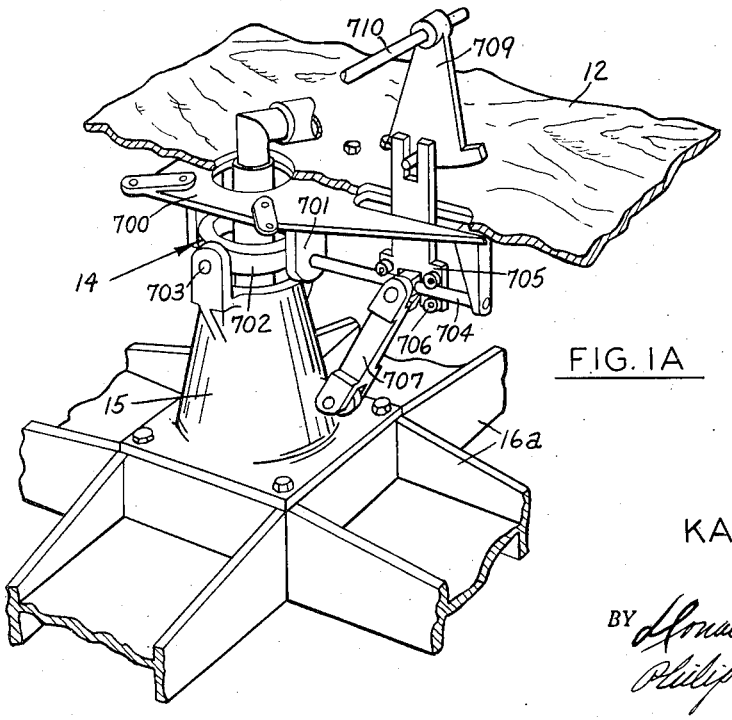
Fig. 1A is a detailed perspective view of the universal joint and associated parts.

Reference is now made to Figs. 1 and 1A which are a general disclosure of grounded aviation trainers of the type covered by U. S. Patents 1,825,462 and 2,099,857. Such trainers comprise a stationary base 10 above which is mounted a fuselage 12 simulating the fuselage of an actual aircraft. Within this fuselage there is a seat for a student positioned to the rear of the control wheel 13. The fuselage 12 rests upon a universal joint 14 and this joint is supported by the pedestal 15 which in turn rests upon the cross arms 16a. A vertical spindle (not shown) which is rotatably held by the stationary base 10 in turn supports the cross arms 16a. The conventional octagon is designated by 16 and as is well known to the prior art, octagon 16 is affixed to the main spindle below the universal joint 14 by means of the horizontal arms 16a so that the octagon 16 rotates with the spindle and fuselage 12 relative to the stationary base 10.

A forward pitching bellows 17 and a rearward pitching bellows 18 are provided, the bottom portions of each of these bellows being affixed to the cross arms 16a which hold the octagon 16 relative to the pedestal 15; and the upper ends of these bellows are affixed to the bottom of the fuselage 12. These two bellows lie in a vertical plane through the longitudinal center of the fuselage 12. Upon the admission of vacuum to the forward bellows 17 and atmosphere to the rear bellows 18, the former bellows collapses and the latter expands causing the fuselage 12 to assume a diving attitude. On the other hand, the admission of vacuum to the rear bellows 18 and of atmosphere to the fore bellows 17 causes the fuselage 12 to assume a climbing attitude. As will be more fully explained later, the admission of vacuum and atmosphere into the bellows 17 and 18 may be controlled by the student in the trainer by moving the control wheel 13 fore and aft of the fuselage 12, so that the student may control the diving and climbing position of the fuselage 12. The diving and climbing position of the fuselage are sometimes referred to as the "pitching position."

At the same time trainers of this type have a left banking bellows 19 as well as a right banking bellows 20 upon the opposite side of the universal joint 14 from the bellows 19. The admission of vacuum and air into these bellows may be controlled by the student through a rotation of the control wheel 13 so that he may place the fuselage 12 in any desired banking position within the limits of the apparatus.

Trainers of the type being considered are often equipped with a stick instead of a control wheel, and it will be readily apparent to those skilled in the art, after reading this application, that they can substitute a stick for the wheel 13 and still obtain all of the advantages of this invention.

Fixedly carried by the octagon 16 are the horizontal arms 21 which support the turning motor 22. By means of a well known pulley arrangement connecting the turning motor 22 with the stationary base 10, the student in the fuselage 12 may, by pressing either of the rudder pedals 30, energize the turning motor 22 in such a direction that the turning motor 22, supporting arms 21, octagon 16, cross arms 16a, bellows 17, 18, 19 and 20, the main spindle, pedestal 15, universal joint 14 and fuselage 12 will rotate either to the left or right, as desired, relative to the stationary base 10. Thus the student may control the simulated heading of the fuselage 12 in the same manner that he would control the heading of a plane in actual flight.

The steps 25 and door 26 allow access to the interior of the fuselage 12 and a slidable canopy 27 may be used to completely encompass the cockpit of the fuselage 12 in order to simulate blind flying conditions. The canopy 27 may be made of a suitable translucent material in order to permit enough light to enter the cockpit of the fuselage to enable the student to manipulate the trainer without the assistance of artificial lights placed in the interior of the fuselage. Such conditions closely simulate day-time blind flight conditions. On the other hand when it is desired to simulate night-time blind flying conditions, a suitable opaque material such as a cover may be placed over the canopy 27 in order that no light enters the cockpit through this canopy. The student must then rely upon the conventional artificial lights which are placed inside the cockpit. Such an arrangement closely simulates night-time blind flying conditions.

An instrument panel 29 is inside the fuselage and upon this panel are instruments which simulate the instruments carried by actual aircraft. As is well known to the prior art, these instruments operate in response to simulated conditions just as the corresponding instruments in a real plane react to real flight conditions.

Figure 2:
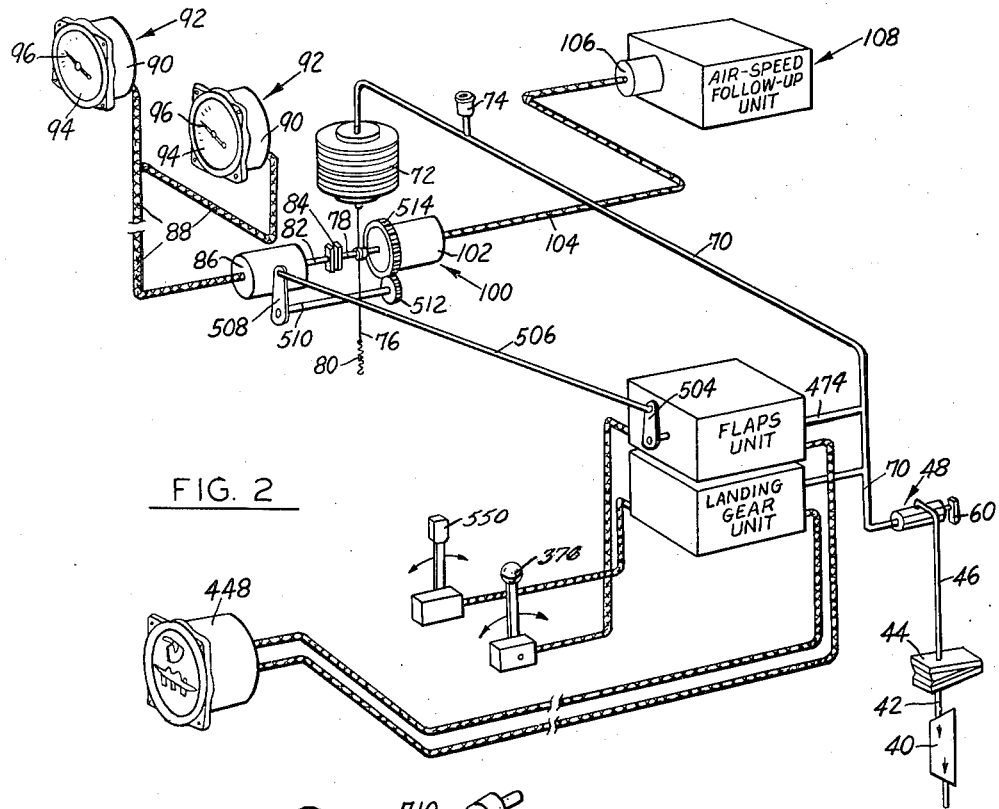
Fig. 2 is a general schematic view of a portion of the air speed system found in trainers of the type being considered, together with the general arrangement of the flaps and landing gear simulating systems.

Reference is now made to Fig. 2 which is a diagrammatic view of the preferred embodiment of the flaps and landing gear simulating systems. In Fig. 2 there is diagrammatically shown a suitable source of vacuum 40 which is connected by the vacuum line 42 to the conventional step-down regulator bellows 44. Bellows 44 is connected through vacuum line 46 with the air speed regulator valve 48 which is shown in detail in Fig. 3, to which reference is now made. Referring to Fig. 3 it will be seen that the air speed regulator valve 48 comprises a main housing 50 which may be suitably affixed to the floor of the fuselage 12. Housing 50 has a central bore 52 which extends completely therethrough. The interior right end of bore 52 is threaded at 54 for coaction with the threads 56 which are integral with the right end of the needle 58 which is placed in bore 52. Upon the outer right end of the needle 58 is affixed the operating arm 60. The interior left end of housing 50 is threaded at 61a for the reception of the hollow plug 62 which is threaded upon its outside as shown. Plug 62 positions the seat 64 inside housing 50 as shown. Housing 50 is also interiorly threaded at 66 for the reception of the hollow threaded plug 67 to which the vacuum line 70 is connected.

Still referring to Fig. 3 it will be seen that the vacuum line 46 is in communication with the longitudinal bore 52 of the housing 50 and that the needle 58 is turned down so that when it is displaced from the seat 64 vacuum may pass through the seat and plug 62 to the vacuum line 70. Referring now to Fig. 2 it will be seen that the vacuum line 70 connects with the interior of a large metallic expansible-collapsible bellows 72, the upper end of which is suitably rigidly affixed to a frame member which is held by the inside of fuselage 12. A suitable bleed 74 is placed in vacuum line 70. Affixed to the lower end of the bellows 72 is the string 76 which winds around the shaft 78 and continues downwardly having its lower end affixed to the upper end of the spring 80, the lower end of which is affixed to any suitable stationary member within fuselage 12. String 76 engages shaft 78 in such a manner that when the bellows 72 collapses the upward movement of the string rotates the shaft 78 in a clockwise direction, and when the bellows 72 expands the spring 80 pulls upon string 76 so that the shaft 78 is rotated counterclockwise. It will be appreciated that the angular rotation of shaft 78 is proportional to the expansion or contraction of bellows 72.

Still referring to Fig. 2, it will be seen that a shaft 82 is coaxial with shaft 78. Affixed upon the right end of shaft 82 is one of the elements of a magnetic coupling 84 and affixed upon the left end of shaft 78 is the other element of this coupling. Consequently, shaft 82 always rotates in the same direction and through the same angle as the shaft 78. The shaft 82 is the input shaft of the self-synchronous transmitter 86 which is connected through the electrical cables 88 with the housings 90 of the self-synchronous receivers which form a part of the assumed air speed indicating units designated generally by 92. One of the air speed indicating units 92 is positioned upon the instrument panel 29 as seen in Fig. 1 in such a manner that the dial 94 and pointer 96 are visible to the student inside fuselage 12. The other indicator 90 is positioned upon the conventional instructor's desk so that its dial 94 and needle 96 are visible to the instructor. As is well known, each of the dials 94 is graduated in the same manner as the dial of the air speed indicator in a real plane and the needles 96 are mounted upon the output shafts of the receivers 90 for movement over the dials 94 in response to an operation of the input shaft 82 of the transmitter 86.

Transmitter 86 and receivers 90 which are electrically connected by means of the cables 88 are of the type that whenever the input shaft 82 of the transmitter 86 moves through a certain number of degrees, the output shaft of each of the receivers 90 upon each of which is affixed one of the needles 96 have a simultaneous movement of the same magnitude imparted to them. The electrical connection may be made so that upon a rotation of the input shaft of the transmitter in one direction the output shaft of each of the receivers rotates in a selected direction, while reversal of direction of the rotation of the input shaft results in a reversal of direction of the movement of the output shaft of each of the receivers. Inasmuch as the transmitter operates the receiver because of the relative movement between the shaft and housing of the transmitter, it will be appreciated that if the input shaft remains stationary a rotation of the housing will also produce a movement of the output shaft of the receiver. A rotation of the housing in a given direction produces the same direction of movement of the output shaft of the receiver as does a rotation of the input shaft in the opposite direction.

Referring now to Figs. 2 and 3, it will be appreciated that whenever the lower end of the operating arm 60 of the air speed regulator valve 48 is moved clockwise as seen from the left in the drawings, the needle 58 is moved toward the seat 64 and less vacuum will be applied from the vacuum line 46 to the vacuum line 70 which connects with the interior of the bellows 72. On the other hand if the lower end of the operating arm 60 is rotated counterclockwise, the needle 58 moves away from the seat 64 and more vacuum passes through valve 48.

The apparatus which is conventionally incorporated in the fuselage 12 for moving the operating arm 60 is not disclosed herein in detail. However, for a detailed disclosure thereof, reference is made to my copending application Serial Number 619,351 filed September 29, 1945, for Aviation trainer. For the purposes of this application it is sufficient to know that the lower end of the operating arm 60 is always positioned in accordance with the combined factors which are developed by apparatus within the trainer to position arm 60 according to the assumed air speed of the trainer.

As disclosed in U. S. Patent 2,099,857 issued to Edwin A. Link, the factors in question are the setting of the simulated throttle lever 61 seen in Fig. 1 which is conventionally placed in these trainers as well as the pitching position of the fuselage 12. As disclosed in my copending application just mentioned above, the lower end of lever 60 is positioned in accordance with the combined factors of manifold pressure and pitching position of the fuselage 12. Manifold pressure in turn depends upon the combined factors of throttle lever setting, propeller governor control lever setting and assumed altitude. The invention disclosed herein will be found by those skilled in the art to be readily adaptable to trainers having a control system like that shown in U. S. Patent 2,099,857 as well as to trainers having a control system such as that disclosed in my previously mentioned copending application. Also, this invention may be adapted for use in conjunction with other types of trainers.

The lower end of lever 60 seen in Fig. 2 is, therefore, responsive to the operation of the various units within the fuselage 12 which are connected into the air speed system in order to produce effects simulating the changes in air speed of a real airplane. Lever 60 is connected to these units so that when any factors are changed to produce a lower assumed air speed, the lower end of lever 60 moves clockwise, and the lower end of lever 60 is moved counterclockise whenever the operation of the units which affect assumed air speed is such that an increase in assumed air speed occurs.

It will therefore be appreciated that whenever a factor is changed so that a decrease in assumed air speed occurs, the lower end of lever 60 is moved clockwise and the needle valve shown in Fig. 3 is operated so that a lesser amount of vacuum passes from the line 46 to the interior of bellows 72 by means of the vacuum line 70. An expansion of bellows 72 will therefore occur—this expansion being proportional to the assumed drop in air speed and the shafts 78 and 82 will be rotated counterclockwise as seen from the left. By means of the transmitting system the needles 96 of each of the indicators 92 will be rotated counterclockwise and thus a lower assumed air speed will be indicated to the student and instructor.

On the other hand should the units within the fuselage 12 operate in such a manner as to produce an increase in assumed air speed, the lower end of lever 60 will be moved counterclockwise. Valve 48 will be operated in such a manner that the needle 58 moves away from the seat 64 and a larger amount of vacuum will be applied from the vacuum line 46 to the vacuum line 70 and the interior of the bellows 72. Bellows 72 will therefore collapse and the shafts 78 and 82 will be rotated clockwise as seen from the left. Each of the needles 96 will be rotated clockwise over its associated dial 94 and a higher assumed air speed will be indicated to the student and instructor.

The above should make it clear that the lever 60 is always positioned according to the instant assumed air speed, and consequently the opening of valve 48 is always in accordance with the instant assumed air speed. Accordingly, bellows 72 will always be distended according to the instant assumed air speed and the rotatable positions of the shafts 78 and 82 will always be governed accordingly. Inasmuch as the position of each of the needles 96 relative to its associated dial 94 is always dependent upon the rotatable position of the shaft 82, it will be appreciated that the position of each of the needles 96 relative to its associated dial 94 will always indicate to the student and instructor the instant assumed air speed.

Reference is again made to Fig. 2 where a second self-synchronous transmitting device is designated generally by 100 and it will be appreciated that the housing 102 of this transmitter may be rotatably mounted in a suitable frame which is affixed within the fuselage 12. Transmitter 102 is connected by means of electrical cable 104 to the self synchronous receiver 106 which is seen to form a part of the air speed follow-up unit designated generally in Fig. 2 by 108.

Reference is now made to Fig. 4 which is a detailed disclosure of the air speed follow-up unit 108. In Fig. 4 the output shaft 106a of the receiver 106 is shown, and upon this output shaft is affixed the spur gear 110. The rod 112 is rigidly mounted in the frame (not shown) of the unit which is affixed to the floor of the fuselage 12. Rotatably mounted upon rod 112 is the gear 114 carrying the contact 116. A pair of split contact segments 118 and 120 are affixed to the insulating disc 122 which, in turn, is affixed to the gear 124 driven by the output shaft 126 of the reversible follow-up motor 128. Gear 124, insulating disc 122 and contact segments 118 and 120 are all mounted for rotation as a unit upon the fixed rod 112. A pair of spring contacts 130 and 132 are held by the frame of the unit so as to bear against the contact segments 118 and 120, respectively. Each of the spring contacts 130 and 132 is connected to the motor 128 through one of the conductors 134 or 136. Contact 116 is grounded to the frame of the unit.

Assuming that the lower end of lever 60 seen in Fig. 2 is moved counterclockwise in Fig. 2 as a result of an increase in assumed air speed, as previously explained a greater amount of vacuum is admitted to the interior of bellows 72 and this bellows is collapsed by an amount dependent upon the increase in assumed air speed. String 76 is pulled upwardly against the action of spring 80 and the input shaft 78 of the transmitter 100 is rotated clockwise. The electrical connection between transmitter 102 and receiver 106 is such that whenever the input shaft 78 of transmitter 100 is rotated clockwise, the output shaft 106a of the receiver 106 seen in Fig. 4 is rotated counterclockwise and gear 114 carrying the contact 116 is rotated clockwise. Assuming that previous to the change in assumed air speed, contact 116 was in engagement with both segments 118 and 120, contact 116 will be moved out of engagement with segment 118, but will remain in contact with segment 120. The motor 128 will be energized and its output shaft 126 will be rotated counterclockwise. Gear 124, insulating disc 122 and the contact segments 118 and 120 will be rotated clockwise, motor 128 continuing to run to rotate these elements until both of the contact segments 118 and 120 are again in engagement with the contact 116. At this instant, motor 128 will stop. As a result of the clockwise rotation of the gear 124, the gear 138 which is affixed upon shaft 140 which in turn is rotatably mounted in brackets (not shown) held by the floor of the fuselage 12 will be rotated counterclockwise.

On the other hand, referring to Fig. 2, should the lower end of lever 60 be moved clockwise as a result of a decrease in assumed air speed it will be appreciated that the apparatus shown in Fig. 2 will be operated in such a manner that the output shaft 106a of the receiver 106 seen in Fig. 4 will be rotated clockwise as will gear 110. Gear 114 will be rotated counterclockwise so that the contact 116 is moved out of engagement with contact segment 120, but it will remain in contact with the segment 118. Motor 128 will be energized to rotate its output shaft 126 clockwise and the gear 124, insulating disc 122, and contact segments 118 and 120 will all be rotated counterclockwise until the contact 116 is again in engagement with both of the segments 118 and 120. At this instant motor 128 will stop. The counterclockwise rotation of gear 124 will result in a clockwise rotation of gear 138. Consequently the statement may be made that the gear 138 is rotated counterclockwise in response to an increase in the assumed air speed, and that the angle through which this gear is so rotated is proportional to the magnitude of the change in air speed. Also gear 138 is rotated clockwise in response to a decrease in assumed air speed, and the angle through which it is so rotated is proportional to the magnitude of the change in assumed air speed. Accordingly, the gear 138 is always positioned in rotation from a predetermined initial point according to the instant assumed air speed, so the position of this gear may be taken as a measure of the instant assumed air speed.

Still referring to Fig. 4, it will be seen that affixed upon the shaft 140 is the depending arm 148, to the lower end of which is pivotally attached the forward end of link 150. It will be appreciated that the link 150 moves to the right in Fig. 4 with an increase in assumed air speed and moves to the left in Fig. 4 with a decrease in assumed air speed. The position of link 150 is therefore positioned at all times in accordance with the instant assumed air speed.

Reference is now made to Fig. 5 which is a schematic view of the altitude system of this invention. In Fig. 5 the conventional altitude tank is designated 152 and this tank is connected to the connector 154 through hose 156. The conventional differential pressure regulator is designated generally 158. The differential pressure regulator includes the four collapsible-expansible metallic bellows 160, 162, 164 and 166. The bellows 160 is connected to the altitude tank 152 through the connection 168 and the bellows 164 is connected to the altitude tank through the connection 170. Consequently, the interior pressure of both of the bellows 160 and 164 is always the same as the pressure within tank 152. Valve 172 is connected to the pressure outlet of pump 174 by the pressure line 176 and this valve is connected to the vacuum side of pump 174 by vacuum line 178. The rod 180 is connected to the movable end of each of the bellows 160 and 162 and a spring 182 of predetermined compression is positioned so that it bears against the bellows 162 at all times. Rod 180 coacts with valve 172 to selectively connect the outlet 184 with the pressure line 176 or vacuum line 178. It will be noted that line 184 also connects with the interior of bellows 162. When the pressure within bellows 162 exceeds the pressure within bellows 160 by more than the compression of spring 182, rod 180 moves toward the right and the vacuum line 178 is brought into communication with line 184 to reduce the pressure within bellows 162. On the other hand, should the pressure within bellows 162 be greater than the pressure within bellows 160 by an amount less than the compression of spring 182, rod 180 is moved to the left and the pressure line 176 is brought into communication with the line 184. Accordingly, the pressure within bellows 162 always exceeds the pressure within bellows 160 and tank 152 by an amount equal to the compression of spring 182.

At the same time, the bellows 164 and 166 have a similar valve 186 and spring 188 arrangement and are connected to the vacuum line and to the atmosphere through port 190 in such a manner that the pressure within the outlet line 192 is always less than the pressure within bellows 164 and tank 152 by a predetermined amount.

For a detailed disclosure of the construction and operation of the pressure regulator 158 reference is made to U. S. Patent 2,358,018 issued to Gunne Lowkrantz upon September 12, 1944. For the purposes of the present application it will suffice to bear in mind that the pressure within line 184 is at all times a predetermined amount higher than the pressure within tank 152 and that the pressure within line 192 is at all times a predetermined amount lower than the pressure within tank 152.

Still referring to Fig. 5, the climb-dive valve assembly is designated generally by 194, the climb valve 196 and the dive valve 198 being shown. The intake port of the climb valve is designated 200 and the intake port of the dive valve is designated 202. Inasmuch as line 192 is connected to the intake port of the climb valve it will be appreciated that the pressure within the intake port is always less than the pressure within altitude tank 152 by the previously described predetermined amount. Also, inasmuch as the intake port 202 of the dive valve 198 is connected to the line 184, the pressure within the intake port 202 will always be higher than the pressure within altitude tank 152 by the previously mentioned predetermined amount. Climb valve 196 is connected to the altitude tank 152 through the line 204, connector 206, line 208, connector 154 and line 156. Dive valve 198 is connected to the altitude tank 152 through line 210, connector 206 and the intermediate connecting elements.

It will therefore be appreciated that by opening the climb valve 196 the pressure within tank 152 will be decreased, the total decrease in the pressure within the tank being a function of the degree to which the climb valve is open and the length of time that the valve remains open. On the other hand, it will be appreciated that by opening the dive valve 198, the pressure within tank 152 will be increased, the total increase in pressure being a function of the extent to which the valve is opened as well as the length of time that it remains open.

The construction of the interior of the climb and dive valves is similar to the valve shown in Fig. 3, and is well known to the prior art, as is the entire altitude system now being described. Dive valve 198 has a left interior thread, while climb valve 196 has a right interior thread.

Means for operating the climb-dive valves to change the pressure within the altitude tank 152 in response to changes in the assumed air speed will now be explained.

Referring to Figs. 6 and 6A it will be seen that the rear end of link 150 is pivotally connected to the upper end of arm 115, the lower end of which in turn is rotatably carried by shaft 114 which in turn is rigidly held by the lower end of arm 112. Arm 112 and shaft 114 may for present purposes be considered stationary. Pivotally connected to the middle portion of arm 115 is the forward end of link 116, the rear end of which is attached to the sleeve 118 which encircles link 211. A pair of spring 720 and 722 encircle link 211 as shown, one of these springs being positioned at each end of sleeve 118, and a stop (not shown) carried by the link 211 is provided at the extreme ends of each of the springs.

In Fig. 6 the climb valve 196 and dive valve 198 are shown. The port 200 of the climb valve is shown to be connected to the line 192 which it will be recalled is connected to the pressure regulator 158 and is supplied with a constant pressure less than the pressure within the altitude tank 152. The climb valve is also shown to be connected through the line 204 with the connector 206 which is connected to the altitude tank 152. Also the port 202 of the dive valve 198 is shown connected to the line 184 which is connected to the pressure regulator and is supplied with a constant pressure higher than the pressure within the altitude tank. Further, the line 210 is shown to connect the dive valve with the connector 206 which is connected to the altitude tank.

In Fig. 6 it will be seen that the climb valve has an operating arm 222 affixed upon the outer end of the stem 224 which is connected to the needle within the valve. Mounted upon the lower end of arm 222 is the roller 226. A spring 228 has its lower end attached to the stud 230 integral with the arm 222, and the other end of this spring is anchored upon the stud 232 integral with bracket 234 which is held by the frame 236 which in turn is affixed to the floor of the fuselage. Both the climb and dive valves are affixed to frame 236. The operating arm 238 of the dive valve is affixed upon the stem 240 which operates the needle within the valve, and a roller 242 is carried by the lower end of arm 238. Spring 244 has its upper end anchored to the stud 232 and its lower end held by the stud 246 carried by operating arm 238. The rear end of link 211 is pivotally attached to the lower end of arm 248, the upper end of which is pivotally carried by the bracket 236. Stud 250 has its inner end carried by the frame 236 and cam 252 is centered upon this stud to be rotated about the axis thereof. Screw 254 holds cam 252 upon arm 248.

Cam 252 is shown in Fig. 6 in its neutral position, i. e., when the combined factors which position the link 211 are such that no change in assumed altitude is occurring. When cam 252 is in the neutral position the climb valve and the dive valve are both open by an equal amount. Consequently just enough air will pass through the dive valve into the altitude tank 152 to offset the amount of evacuation of the altitude tank through the climb valve. Accordingly when the climb and dive valves are in their neutral positions, the pressure within the altitude tank 152 does not vary.

When the link 150 in Fig. 4 moves to the right in Fig. 4 as a result of an increase in assumed air speed, it will be appreciated that the cam 252 in Fig. 6 will be rotated counterclockwise. The lobe 256 of the cam will force roller 226 to the left and the climb valve will be opened to a greater extent. At the same time the roller 242 will be pulled by spring 244 closer toward the center 250 of the cam because lobe 258 will also be rotated counterclockwise. Operating arm 238 will therefore be rotated counterclockwise and a closing of the dive valve will occur. Consequently a greater amount of vacuum will be admitted through climb valve to the altitude tank and at the same time a decreased amount of air will pass through dive valve to the altitude tank. Consequently the pressure within altitude tank will drop.

On the other hand referring to Fig. 4, should the gear 138 be rotated clockwise in response to a decrease in assumed air speed, it will be appreciated that the link 211 shown in Fig. 6 will be moved toward the head of fuselage 12. Cam 252 will therefore be rotated clockwise and lobe 258, bearing against roller 242, will rotate the operating arm 238 of the dive valve so that the dive valve will be opened to a greater extent. At the same time, the spring 228 will rotate the operating arm 222 of the climb valve counter-clockwise, because roller 226 will be kept in contact with lobe 256 and the climb valve will be closed to a greater extent. Accordingly, less vacuum will be applied to the altitude tank 152 and a greater amount of pressure will be applied to that tank. The pressure within tank 152 will therefore increase.

Still referring to Fig. 5, it will be seen that the conventional vertical speed transmitter 260 is connected to the altitude tank 152 by vacuum line 261 and is connected to the vertical speed indicators 262 by cables 263. Also, the conventional altimeter transmitter 264 is connected to the altitude tank by vacuum line 265 and intermediate connecting elements and to the altimeters 266 by cables 267. One vertical speed indicator and one altimeter are placed upon the instrument panel 29 inside fuselage 12 and the companion instruments are placed upon the instructor's desk. As is well understood by those skilled in the art, the vertical speed indicators always indicate the instant assumed vertical speed, dependent upon the rate of change and direction of change (increase or decrease) of the pressure within tank 152, while the altimeters indicate an instant assumed altitude dependent upon the absolute change in pressure within the tank. The higher the pressure the lower is the indicated altitude, and an increase in pressure within the tank results in a downward indication by the vertical speed indicators.

In view of the above disclosed arrangement it will be appreciated that the link 150 seen in Fig. 4 is always positioned in accordance with the relative rotational positions of the shaft 78 and housing 102 of the transmitter 100 seen in Fig. 2, and that the relative rotational positions of these elements may be employed to control the pressure within the altitude tank 152, and consequently the readings of the vertical speed indicators 262 and altimeters 266. Primarily, these relative rotational positions depend upon the instant assumed air speed, but as will be later shown, the relative positions in question may be modified according to the assumed flap and landing gear positions to affect the readings of the vertical speed indicators and altimeters.

Parenthetically, means for also operating the climb-dive valves according to the pitch attitude of fuselage 12 will now be described. Reference is made to Fig. 1A where it will be seen that the fuselage 12 rests upon the plate 700 which is attached to the upper yoke 701 of the universal joint 14. The gimbal ring of universal joint 14 is designated 702, this gimbal ring being free to rock about the axis 703, pedestal 15 holding ring 702. Yoke 701 is free to rock about an axis through ring 702 at right angles to the axis 703. Axis 703 extends transversely of the fuselage 12 and is the axis about which the fuselage moves whenever its pitch attitude is changed. Affixed to the yoke 701 is the rearwardly extending rod 704 upon which is movably mounted the carriage 705 which is provided with rollers 706 for easy movement therealong. The link 707 is pivotally connected to the pedestal 15, as shown, and the upper end of this link is pivotally connected to the carriage 705.

The upper end of carriage 705 is slotted, as shown, and within this slot is the stud 708 which is affixed to the pitch action sector 709. The upper end of sector 709 is affixed to the tranvserse shaft 710 which is rotatably held by suitable brackets (not shown) affixed to the floor of fuselage 12. Whenever the fuselage 12 assumes a diving attitude, it will be appreciated that the rear end of rod 704 is moved upwardly and that the carriage 705 moves toward the head of the fuselage, or to the left in Fig. 1A. The lower end of sector 709 is moved ahead and the shaft 710 is rotated clockwise. On the other hand, whenever the fuselage 12 assumes a climbing attitude, the carriage 705 moves to the rear of rod 704 and the shaft 710 is rotated counterclockwise.

Referring now to Fig. 6A, it will be seen that the arm 712 is rigidly carried by shaft 710. The connections between arm 712 and shaft 714 have been previously explained. When fuselage 12 assumes a diving position, shaft 714 is moved toward the head of the fuselage, link 211 is moved in the same direction, the dive valve is opened farther and the climb valve is closed. The pressure within tank 152 increases accordingly, and the altimeters and vertical speed indicators are properly operated. On the other hand, when the fuselage 12 assumes a climbing attitude the aforementioned parts are operated in opposite directions so that the pressure within tank 152 decreases, causing the instruments to properly respond. Accordingly, the climb and dive valves are operated in accordance with the combined factors of assumed air speed and pitching attitude.

Also, it may be explained at this point that in Fig. 6A the air speed regulator valve 48 is shown to be mounted upon the bracket 730 which is affixed to the floor of fuselage 12. The operating arm 60 is moved by the air speed cam 732 which is affixed upon the arm 734 which is pivotally carried by bracket 730. Link 736 actuates arm 734 which moves cam 732 to operate the arm 60 of the air speed valve. Link 736 has its forward end pivotally connected to the lower end of the well-known pitch-action walking beam 738 which is pivotally carried by the stub shaft 740 which in turn is carried by the upper end of arm 712. The fore end of link 742 is pivotally connected to the upper end of walking beam 738, and the link 742 may be actuated by the throttle lever 61, or by assumed manifold pressure in the manner described in detail in my copending application Serial Number 619,361. Accordingly, the walking beam 738 combines the factors of assumed engine power (throttle lever position or assumed manifold pressure), so that the link 736 and arm 60 are always positioned in accordance with instant assumed air speed.

In view of the above arrangement, whenever fuselage 12 assumes a diving attitude, shaft 710 is rotated clockwise as seen from the left, shaft 740 is moved to the rear, and walking beam 738 is pivoted about the point at which link 742 connects thereto. Accordingly link 736 moves to the rear, and valve 48 is opened, operating the apparatus shown in Fig. 2 as previously explained. A climbing position of fuselage 12, of course, produces opposite movements and effects.

The link 742 may be operated by any suitable mechanism, such as the throttle lever as explained in U. S. Patent 2,099,857, or by the manifold pressure engine unit, as explained in my co-pending application Serial Number 619,361, in order to operate the air speed regulator valve in accordance with assumed engine power. When this factor is increased the link 742 moves ahead, thereby opening the air speed regulator valve, and when this factor is decreased, link 742 moves to the rear to proportionately close the valve.

Accordingly, the air speed regulator valve is always opened by an amount dependent upon the combined factors of pitch attitude and engine power. Engine power in turn may be constituted as desired.

Means will now be disclosed for affecting the pitching attitude of the fuselage 12 according to the position of gear 138 which in turn depends upon the relative rotational positions of the shaft 78 and housing 102 of transmitter 100 seen in Fig. 2.

Referring again to Fig. 4, the arm 272 is affixed upon the right end of shaft 140 and pivotally attached to the lower end of this arm is the rear end of link 274, the fore end of which is pivotally attached to the left end of walking beam 276 which has its inner end pivotally mounted upon the vertical stub shaft 278, the lower end of which is held by walking beam 280. Fixedly attached to the walking beam 276 is the vertical stub shaft 282 upon which is pivotally mounted the arm 284 which has attached to its left end the link 286, the purpose of which is fully described in the co-pending application Serial Number 619,361, but which may, for present purposes, be considered to be stationary. The right end of arm 284 is pivotally mounted upon the stub shaft 288 which is held by the bracket 290 which in turn is affixed to the floor of the fuselage 12. Pivotally connected to the left end of walking beam 280 is the fore end of link 292, the purpose of which is also fully described in the co-pending application Serial Number 619,361, but which may for the purposes of this invention be considered stationary. (The walking beams 276 and 280 and the arm 284 as well as their associated members collectively form the unit 300 which is sometimes termed the trim compound differential.) Pivotally attached to the right end of walking beam 280 is the rearwardly extending link 294, the rear end of which is attached to the lower arm 296 of the bell crank designated generally 298. The upper arm 302 of bell crank 298 has pivotally connected thereto the left end of link 304, the right end of which, as seen in Fig. 7, is pivotally connected to the integral arm of the center leaf 306 of the elevator valve designated generally by 308.

In Fig. 7 it will be seen that there is provided a hollow metallic manifold 310 fixedly mounted within fuselage 12 which is connected by suitable means to the conventional turbine placed in these trainers. Manifold 310 is always evacuated to a reduced pressure by the turbine or, as is often stated herein for convenience, is always provided with vacuum. In the center of the upper surface of the manifold is the hole 312 adapted to receive in an air-tight fashion the central stem 313 of the elevator valve. The lower leaf of the elevator valve is designated 314 and this leaf is fixedly mounted upon the top of manifold 310 by means of the screws 315 which fit into the top of the manifold by virtue of the tapped holes 316. Elevator valve 308 also comprises a top leaf 317 and when assembled, the upper and lower flat surfaces of the center leaf 306 lie against the flat lower surface of upper leaf 317 and the flat upper surface of lower leaf 314, respectively. The lower leaf 314 has two vertical ports 318 and 319 which open through the upper surface of leaf 314. Port 318 is in communication with the horizontal fitting 320 which is connected by means of the flexible tubing 321 with the forward pitching bellows 17 shown in Fig. 1. Similarly, port 319 communicates with fitting 322 which is connected by means of flexible tubing 323 with the rear pitching bellows 18, seen in Fig. 1.

Center leaf 306 of the elevator valve is provided with a central bore 324, the lower portion of which is adapted to fit around the boss 325 integral with lower leaf 314. A pair of vertical ports 326 and 327 extend completely through the center leaf 306. An arcuate counter-bore 328 is placed in the lower surface of center leaf 306, this counterbore having one end commonly formed with the lower end of port 326. A second counter-bore 329 bears a similar relation to the leaf 306 and vertical port 327.

The upper leaf 317 is provided with an integral cylindrical boss 330 and a port 331 is drilled completely through the upper leaf. A plug 332 is inserted in the upper end of port 331. The upper portion of central stem 313 is provided with a plurality of ports 333 so that the central vertical port 331 of the upper leaf is at all times supplied with vacuum. Communicating with the central port 331 is the duct 334a which has an upper portion extending horizontally within leaf 317 and a lower vertical portion, also within leaf 317, communicating with the arcuate counter-bore 334 placed in the lower face of leaf 317.

Also placed within the leaf 317 are the ports 335 and 336. Each of these ports has an upper horizontal portion emerging through the side of leaf 317 and a lower vertical portion emerging through the lower face of this leaf. Each of the ports 335 and 336 is therefore at all times in communication with the atmosphere.

In Fig. 7, the leaves 317, 306 and 314 are shown in their neutral rotative positions. When the leaves are in their operative assembled position, the arcuate counter bore 334 slightly overlaps the ports 326 and 327. Also, the end of the counterbore 328 slightly overlaps the port 318 and the end of counter-bore 329 slightly overlaps the port 319. Also, when the leaves are in their neutral positions, the lower end of port 335 is slightly displaced from port 326 and the lower end of port 336 is slightly displaced from port 327. Consequently, when the leaves of the elevator valve are in their neutral positions the overlap of counter-bore 334 with respect to the ports 326 and 327 and the overlap of counter-bores 328 and 329 with respect to the ports 318 and 319 result in the application of a limited amount of vacuum to both the forward and rear pitching bellows 17 and 18. The bellows 17 and 18 are therefore equalized and the trainer fuselage 12 is longitudinally level.

As is completely explained in the co-pending application Serial Number 619,361, the wheel 13 is connected to the upper leaf 317 of the elevator valve. At this point it may be stated that when the wheel 13 is in its fore-and-aft neutral position, the upper leaf 317 is in its neutral rotational position. However, when the wheel 13 is moved ahead of its neutral position, the upper leaf 317 of the elevator valve is rotated clockwise from its neutral position. Accordingly, as seen in Fig. 7, the counter-bore 334 overlaps port 326 by a greater amount and increased vacuum is applied to port 326. Through counter-bore 328 this increase of vacuum is applied to port 318 and by means of connector 320 and tubing 321 the increased vacuum is applied to the forward pitching bellows 17. Simultaneously therewith, the counter-bore 334 becomes out of engagement with the port 327 and the port 336 is brought into overlapping relation with the port 327. Atmosphere therefore is admitted to the port 327 and passes through the counter-bore 329, port 319, the connector 322 and flexible hose 323 to the rear pitching bellows 18. Consequently, a movement of the control wheel 30 ahead of its neutral position admits increased vacuum to the forward pitching bellows 17 and stops the application of vacuum to the rear bellows 18, applying to the rear bellows atmosphere. The forward bellows is therefore collapsed and the rear bellows is expanded, resulting in a lowering of the fore end of the fuselage 12 and a raising of the rear end of the fuselage. The fuselage therefore assumes a position simulating the diving attitude of a plane in actual flight. A real airplane, of course, assumes a diving attitude when the control wheel is pushed ahead of its neutral position.

On the other hand, assuming that the control wheel 13 is in its neutral position, the upper leaf 317 of the elevator valve 308 will be positioned in its previously described neutral position. A rearward movement of the control wheel from the neutral position will result in a counterclockwise rotation of upper leaf 317, causing counterbore 334 to move out of overlapping position relative to port 326 and causing atmosphere port 335 to overlap port 326. Consequently atmosphere will be applied to the fore pitching bellows 17. Simultaneously, counter-bore 334 will be brought into greater overlapping position relative to port 327 and greater vacuum will be applied to rear pitching bellows 18. Bellows 18 is collapsed, bellows 17 expanded, and fuselage 12 assumes a climbing attitude.

Assuming that the leaves of the elevator valve 308 are in their neutral position, it will be appreciated that a clockwise rotation of the center leaf 306 will have the same effect as a counterclockwise rotation of the upper leaf 317. Accordingly, a clockwise rotation of the center leaf will cause an increased application of vacuum to the rear bellows 18 and an application of atmosphere to the front bellows 17, resulting in a raising of the nose of the fuselage 12. On the other hand, a counterclockwise rotation of the center leaf 306 will result in increased vacuum being applied to the front pitching bellows and an application of vacuum to the rear bellows, so the fuselage nose will drop.

Referring to Fig. 4, it will be appreciated that whenever gear 138 rotates counterclockwise in response to a clockwise movement of the shaft 78 relative to the housing 102 of transmitter 100 seen in Fig. 2, the link 274 moves to the rear pulling the left end of walking beam 276 in the same direction. Inasmuch as link 286 remains stationary, arm 284 also does not move. Walking beam 276 will therefore be pivoted about the axis of shaft 282 and consequently the right end of walking beam 276 and the shaft 278 move toward the head of the fuselage. Inasmuch as link 292 is in effect stationary, the right end of walking beam 280 also moves toward the head of the fuselage and link 294 moves in the same direction. Bell crank 298 moves link 304 toward the right side of the fuselage and the center leaf 306 of the elevator valve 308 seen in Fig. 7 is rotated clockwise. Assuming that the leaves of the elevator valve were neutrally positioned before the relative movement between shaft 78 and housing 102 occurred, as previously explained during the detailed description of the elevator valve 308, a slight amount of vacuum is applied from the counterbore 334 through the ports 326 and 327 to the hoses 321 and 323 which connect with the fore and aft pitching bellows 17 and 18. Fuselage 12 is therefore longitudinally level. However, the clockwise rotation of the middle leaf 306 as a result of the operation of transmitter 100 moves the port 326 of the center leaf away from the counterbore 334 and the port 326 engages the atmosphere port 335. Atmosphere is therefore admitted through the port 326, port 318, connector 320 and hose 321 to the forward pitching bellows 17. Simultaneously, the port 327 comes into increased engagement with the vacuum counterbore 334 and an increased amount of vacuum is applied through port 327 to port 319 and thence to the rear pitching bellows 18 by means of connector 322 and hose 323. The application of atmosphere to the fore pitching bellows 17 causes it to expand and the application of increased vacuum to the rear pitching bellows 18 causes it to collapse. The nose of the trainer is therefore lifted.

On the other hand, assuming that the gear 138 shown in Fig. 4 is rotated clockwise as a result of a counterclockwise movement of the shaft 78 relative to the housing 102 of transmitter 100, it will be appreciated that the link 304 will be moved toward the left side of the fuselage 12. The middle leaf 306 of the elevator valve will be rotated counterclockwise. Assuming that before this operation occurred, the leaves of elevator valve 308 were neutral with respect to one another, the counterclockwise rotation of the leaf 306 will cause the port 326 to overlap the vacuum filled counter-bore 334 to a greater extent and increased vacuum will be applied to the fore pitching bellows 17 through port 318, connector 320 and hose 321. Simultaneously, port 327 will engage the atmosphere port 336 in the upper leaf 317 and atmosphere will be applied to the rear pitching bellows 18 through port 319, connector 322 and hose 323. As a result the fore pitching bellows 17 will be collapsed and the rear pitching bellows 18 expanded, resulting in a nosing down of fuselage 12. Accordingly, whenever the shaft 78 in Fig. 2 is rotated clockwise relative to housing 102 (or housing 102 is rotated counterclockwise relative to shaft 78), the nose of the fuselage 12 is raised. Conversely, whenever the shaft 78 is rotated counterclockwise relative to housing 102 (or housing 102 is rotated clockwise relative to shaft 78), the nose of fuselage 12 drops. It will also be recalled that whenever the shaft 78 is rotated clockwise relative to housing 102 (or housing 102 is rotated counterclockwise relative to shaft 78) the pressure within tank 152 decreases and the altimeters and vertical speed indicators respond properly to indicate a higher assumed altitude and the assumed rate of ascent. Opposite relative movements between the housing 102 and shaft 78 result in an increase in pressure within the tank 152 and the instruments just mentioned reflect the lower altitude and assumed rate of descent. Furthermore, a raising of the nose of fuselage 12 results in a decrease in the pressure within tank 152, with the altimeter showing an increase in assumed altitude and the vertical speed indicators showing the assumed rate of ascent. A lowering of the nose of the fuselage produces opposite results.

In view of the preceding explanation the conclusion may be drawn that altitude and vertical speed as indicated by the altimeters and vertical speed indicators are functions of the combined factors of fuselage attitude and assumed air speed. Assumed air speed in turn affects fuselage attitude.

Flaps simulating system

Reference is now made to Fig. 8 which is an exterior view of the wing flaps and landing gear control box. This box is designated in Fig. 8 by 374 and its location within the fuselage 12 is also shown in Fig. 1. It will be seen that the wing flaps control lever is designated 376 and is pivoted about its lower end which is pivotally attached to the switch box 378 which is held within the box 374. A plate 380 is fixedly attached to the sloping face of box 374, this plate having a slot 382 through which the flaps lever 376 may move. It will be noted that one end of the slot 382 is designated "up" while the opposite end is designated "down." A central portion of this slot is designated "off" and it will be noted that in the center of slot 382 there is an offset notch 384. Lever 376 is spring biased so that it will slip into and be retained in notch 384 should the student guide the lever to this location. Reference is now made to Figs. 9 and 10 which are detailed disclosures of the electrical and mechanical features of the flaps system. The switch 378 which is operated by the flaps lever 376 is shown in Fig. 9. The reversible shaded-pole motor which is controlled by switch 378 is designated in Figs. 9 and 10 by 386. It will be seen that the main coil of this motor is designated 388 and is continuously supplied with 110 volts A. C. through conductors 390.

Referring now to Fig. 8, assuming that the wing flaps lever 376 is positioned as shown, namely, in the notch 384 which is the "off" position, reference to Fig. 9 will show that the movable contact 392 of switch 378 is out of engagement with the "up" contact 394 as well as with the "down" contact 396. Accordingly, motor 386 is not energized. However, assuming that the student desires to simulate the lowering of the wing flaps, he pushes sideways upon the control lever 376 to disengage it from the notch 384 and moves it to the "down" position. Contact 392 therefore engages contact 396 and in Fig. 9 it will be appreciated that the circuit comprising conductors 398, contacts 400 and 402, conductor 404, shading coil 406 and conductors 408 and 410 is closed and the rotor 412 of motor 386 rotates counterclockwise as seen in Fig. 9. Referring to Fig. 10, the output shaft 414 which is splined as shown will rotate counterclockwise and the gear 416 which meshes with the splined output 414 will be rotated clockwise, as seen in Fig. 10. Gear 416 is affixed upon the shaft 418 which is rotatably mounted in a suitable frame member. A suitable insulating spacer 420 is carried by the gear 416 and the cam 422 is affixed to spacer 420 for rotation therewith. It will be appreciated that whenever the rotor 412 of motor 386 rotates counterclockwise, the cam 422 will be rotated in the opposite direction. Accordingly as long as flaps lever 376 is held in the "down" position, motor 386 will continue to be energized and cam 422 will be rotated clockwise. When cam 422 reaches a predetermined clockwise position, the spring member 424 which engages the periphery of this cam will be opposite the notch 426 in the periphery of cam 422 and it will spring to the left in Figs. 9 and 10. At that instant the contact point 402 will be moved in the same direction and it will be appreciated that the above outlined circuit will be opened. Accordingly, motor 386 cannot run in the explained direction and it will stop. At the same instant that the motor 386 is stopped, referring to Fig. 9 it will be appreciated that the movement to the left of spring contact 424 results in a similar movement of the upper end of contact 428. This contact accordingly will engage the contact 430 and it will be appreciated that the circuit comprising the two contacts 428, 430, the two conductors 432, 434 and the light 436 will be closed. Accordingly, light 436 will be energized and inasmuch as this light is positioned at any suitable point exterior of the fuselage 12 and visible to the instructor, its energization will indicate to the instructor that the student has taken the necessary steps to place the flaps in the "down" position.

Still referring to Figs. 9 and 10, while the motor 386 is energized in the previously explained direction and is rotating the cam 422 clockwise, it will be appreciated that the gear 438 which is affixed upon the right end of shaft 418 is also rotated clockwise. The gear 440 which is affixed upon the left end of the input shaft or rotor 442 of the D. C. self-synchronous transmitter 444 will be rotated counterclockwise, as will the input shaft 442. The transmitter 444 is connected by means of electrical connection 446 with the flaps and landing gear indicator 448, shown in Fig. 2, the front appearance of which is indicated in Fig. 11 and the electrical arrangement of which is shown in Fig. 9. In Fig. 9 it will be noted that the electrical portion of this indicator comprises two series-wound coils 450 which are placed 120 degrees apart on a laminated core 451. These coils are connected to a suitable source of direct current, as shown, the other side of which is grounded. Rotor 442 of the potentiometer 444 is also grounded. Pivotally mounted for rotation within the coils 450 is the permanent magnet 452 which has a north and south pole. Referring to Fig. 11 it should be stated that the flaps indicating element 454 which indicates the assumed position of the flaps is attached to the permanent magnet 452 for movement therewith. It will be appreciated by those skilled in the art of electricity that the rotatable position of the magnet 452 relative to the coils 450 depends upon the position of the rotor 442 relative to the stator resistance winding 444. The transmitter 444 and indicator shown in Fig. 11 form a standard aircraft transmitting system, and therefore, should be understood by those skilled in the art.

Accordingly, as the motor 386 runs to turn the cam 422 clockwise it will be appreciated that the gear 440 upon the outer end of the rotor 442 of the stator 444 is rotated counterclockwise. In Fig. 9 the rotor 442 may be set to move downwardly and the magnet 452 will be rotated clockwise in Fig. 9, causing the flaps indicator 454 in Fig. 11 to rotate clockwise and thus to indicate a constantly increasing downward position, until the motor is stopped, as above explained.

It will be appreciated that the previously described apparatus is adjusted so that when the cam 422 reaches the position where the spring contact 424 engages the notch 426 to stop the motor 386, the indicator 454 shown in Fig. 11 will be in its most advanced clockwise position, and consequently will be perpendicularly disposed to indicate that the flaps are assumed to be completely "down."

As has been previously explained, when the pilot of a real plane lowers the flaps of the plane, the air speed of the plane drops in proportion to the extent of the lowering of the flaps. At the same time the attitude and vertical speed of the plane may be affected by the lowering of the flaps. In some types of aircraft the lowering of the flaps causes the nose of the plane to drop, while in other types of aircraft the lowering of the flaps causes the nose of the plane to rise. In still others, the lowering of the flaps has no appreciable effect upon the attitude of the plane. Insofar as vertical speed is concerned, the lowering of the flaps provides a considerable increase in lift, in spite of the accompanying decrease in air speed, and a very definite effect on vertical effect on vertical speed is produced, this effect in turn affecting altitude. Thus, if the plane is descending, the rate of descent is decreased or in the event that the rate of descent is initially not too great, the lowering of the flaps may produce a positive rate of ascent.

The following means are incorporated in this invention in order that the assumed lowering of the flaps of the trainer will affect the indicated air speed, indicated vertical speed and consequently the indicated altitude, as well as the pitching position of the fuselage, in simulation of the manner in which the lowering of the flaps in a real plane affect the operation of the plane and the instruments therein. First, means will be disclosed for simulating a plane in which the lowering of the flaps produces a drop in air speed, a tendency to increase vertical speed upwardly, and to raise the nose of the plane.

Referring now to Fig. 10 it will be seen that the gear 438 meshes with the gear 460 which is affixed upon the outer end of the shaft 462 of the flaps valve 464. In Fig. 12 it will be seen that the flaps valve 464 is much like the air speed valve 48, with the exception that a gear 460 is provided to operate the needle 466, instead of an operating arm as is the case in the air speed valve. It will be noted that the flaps valve 464 is not connected to a source of vacuum but instead a bleed hole 468 is provided, this bleed hole being connected to the atmosphere through the filter 470. Whenever the needle 466 is displaced from its seat it will be appreciated that atmosphere will pass through the bleed hole 468 and the needle valve through capillary 472 and the line 474, also seen in Fig. 2 to which reference is now made, to the vacuum line 70 which connects the air speed regulator valve 48 with the large expansible-contractible metallic bellows 72.

Referring to Fig. 10, whenever the gear 438 is positioned so that the gear 440 occupies such a position that the permanent magnet 452 in Fig. 9 is positioned so that the flap indicator 454 in Fig. 11 indicates that the flaps are completely "up," the gear 460 which operates the needle 466 of the flap valve shown in Fig. 12 is positioned so that the needle bears against the seat of the valve. Accordingly, no atmosphere leaks from the atmosphere through the bleed hole 468 and through the needle valve to the capillary and through line 474 into the vacuum line 70 which connects the air speed regulator valve with the bellows 72. Consequently whenever the indicator 454 in Fig. 11 indicates that the flaps are assumed to be in their "up" position, no simulated flap effect is present upon the air speed as indicated by the indicators 92 nor upon the pitching attitude of the fuselage. Also, under these circumstances, the flaps unit does not in any manner affect the operation of the simulated altimeters and vertical speed indicators.

At the same time it will be appreciated that as the gear 438 seen in Fig. 10 is rotated clockwise in order to move the flaps indicator 454 in Fig. 11 toward the "down" position, the gear 460 seen in Fig. 10 is simultaneously rotated counterclockwise and the needle valve seen in Fig. 12 is gradually opened. Capillary 472 is employed to prevent a surge of air from passing into line 70 upon an opening of the needle valve. It will be appreciated that the extent of the opening of this needle valve is at every instant in keeping with the position of the flaps indicator 454 seen in Fig. 11. The farther down the flaps indicator 454 is positioned, the greater is the opening of the needle valve. As the needle valve seen in Fig. 12 is opened to a greater extent, an increased amount of atmosphere passes through this valve and into the line 70 which controls the expansion and collapsing of the metallic bellows 72 in Fig. 2. The larger the amount of atmosphere which enters through this valve into the line 70, the greater will become the expansion of this bellows. It will be appreciated that the gradual expanding of bellows 72 as a result of an opening of flaps valve 464 will produce the same effect upon the reading of the air speed indicators 92 as though this expansion of bellows 72 were caused by a closing of the air speed regulator valve 48, and the air speed indicators 92 will indicate a lower assumed air speed. Accordingly, the conclusion may be drawn that when the student within the fuselage moves the flaps control lever 376 into the "down" position, the flaps indicator 454 seen in Fig. 11 is progressively moved toward the "down" position, and the air speed indicators 92 are operated to indicate a progressively lower assumed air speed. Because of the gradual expansion of the bellows 72, there will be a proper lag between the movement of the flaps indicator 454 and the falling off of the assumed air speed as indicated by the air speed indicators. This closely simulates the corresponding situation in actual flight.

At the same time as the bellows 72 operates the transmitter 86 to affect the reading of the air speed indicators, it will be appreciated that the transmitter 100 would normally be operated so that the output shaft 108 of the receiver 106 seen in Fig. 4 is rotated clockwise.

However, referring to Fig. 10 there is provided the gear 500 which meshes with the gear 440 which is driven by gear 438 upon the shaft 418. Gear 500 is affixed upon the right end of shaft 502 which is suitably rotatably mounted in a suitable frame member. Upon the left end of shaft 502 is the arm 504 to the upper end of which is pivotally attached the rear end of link 506. Referring now to Fig. 2, the arm 504 and link 506 are shown and it will be seen that the forward end of link 506 is pivotally connected to the upper end of arm 508, the lower end of which is fixedly mounted upon the shaft 510 which is suitably rotatably mounted in the frame of the unit. Upon the right end of shaft 510 is fixedly mounted the gear 512, and this gear meshes with the gear 514 which is affixed to the housing 102 of the transmitter 100. Housing 102 is suitably rotatably mounted in the frame of the unit.

Referring now to Fig. 10 it will be appreciated that whenever the flap control lever 376 is moved ahead in order to simulate the lowering of the flaps of a real plane, the gear 438 is rotated clockwise and gear 440 rotates counterclockwise. Accordingly gear 500 will be rotated clockwise and the upper end of arm 504 will move toward the rear of the trainer. Link 506 moves in the same direction and referring to Fig. 2 it will be appreciated that the upper end of arm 508 moves in the same direction. Accordingly shaft 510 is rotated clockwise as is gear 512, which movement results in a counterclockwise rotation of the gear 514 and housing 102, gear 514 being affixed upon the housing 102 of the transmitter 100. As has been explained, the counterclockwise rotation of housing 102 relative to shaft 78 produces the same effect as a clockwise rotation of the shaft 78 relative to housing 102.

Accordingly, the opening of the flaps valve 464 in response to a placing of the flaps lever 376 in the "down" position results in a counterclockwise rotation of shaft 78 inside housing 102, but at the same time the motor 386 through the just described system rotates the housing 102 counterclockwise relative to shaft 78. Inasmuch as the rotation of the housing is greater than the rotation of the shaft, the net effect is the same as though the shaft 78 were rotated clockwise through an angle equal to the difference between the respective angular rotations. Accordingly, the apparatus shown in Fig. 4 is actuated, as previously described, in such a manner that the center leaf of the elevator valve shown in Fig. 7 is rotated clockwise. As previously explained this rotation results in a raising of the nose of the fuselage. The student may, of course, execute such compensating movements by manipulation of the control wheel 13 as are correct under the circumstances.

At the same time it will be appreciated that the link 150 in Figs. 4 and 6A will be moved to the rear, opening the climb valve 196 and closing the dive valve 198 so that the rate of change of pressure within the altitude tank is properly affected. Thus, if previous to the operation of the flap lever the vertical speed indicators showed a rapid assumed rate of descent, this rate will be definitely decreased, while if they showed only a moderate rate of descent, the effect may be such as to produce an indicated rate of ascent. The altimeters will, of course, properly reflect the change in assumed altitude.

It will be appreciated by those skilled in the art that when the flaps of the plane are in a lowered or partially lowered position, the raising of the flaps returns the plane to its normal flight characteristics, and, of course, the flaps indicator is moved to show at all times the instantaneous position of the flaps. The following means, a portion of which have been previously described, may be incorporated in this invention to simulate the response of a plane in actual flight to the raising of the flaps.

Assuming that the cam 422 seen in Fig. 9 is positioned in a clockwise position as it is when flaps are assumed to be fully or partially down, it will be appreciated that if the student places the flaps control lever 376 in the "up" position, the movable contact 392 of switch 378 seen in Fig. 9 will engage the contact 394 and the circuit comprising conductors 408 and 410, coil 530, conductor 532, contacts 534 and 536 and conductor 538 will be closed, in this event the contacts 534 and 536 being held in engagement by the spring contact 540. Accordingly the rotor 412 of the reversible followup motor 386 will turn in the clockwise direction as indicated in Figs. 9 and 10 and the output shaft 414 will turn in the same direction. Accordingly the shaft 418 will rotate in the counterclockwise direction as will the cam 422 and the gear 438 which is upon the shaft 418. The motor 386 will continue to run in this manner until the cam 422 is rotated counterclockwise to the point where spring 540 engages the notch 426 and the contacts 534 and 536 become disengaged. At this instant motor 386 will stop.

All the time that motor 386 is turning the output shaft 414 in the clockwise direction and the gear 438 in the counterclockwise direction, it will be appreciated that the gear 460 upon the shaft 462 which is integral with the needle of the flaps valve 464 will be rotated clockwise and the opening within this valve will be progressively closed durng the same period, thereby constantly reducing the amount of atmosphere passing through this valve and into the vacuum line 70 which connects with the interior of the expansible-collapsible metallic bellows 72 seen in Fig. 2. Accordingly, the vacuum passing through the air speed regulator valve 48 will increasingly manifest itself upon the bellows 72. Accordingly the farther the flaps valve 464 is closed, the more effective will be the vacuum passing through valve 48 upon the bellows 72 and the greater this bellows will be collapsed.

The collapsing of bellows 72 will result in a clockwise rotation of shaft 78 inside housing 102 to return it to its normal position unaffected by the flaps system. Also, at the same time, referring to Fig. 10, the reversing of motor 386 will operate the gears 438, 440 and 500 to move the upper end of arm 504 ahead, and referring to Fig. 2, the housing 102 will be rotated clockwise to its normal position. Accordingly, as the motor 386 is rotated in response to the placing of the flaps lever 376 in the "up" position, the transmitter 100 is progressively restored to its normal position. It is believed unnecessary to explain in detail that the elevator valve will be operated to lower the nose of the fuselage to its normal position, and that the climb and dive valves will be operated to eliminate the effect introduced upon them by the previous lowering of the flaps. Therefore the vertical speed indicators and altimeters are restored to normal.

At the same time that the motor 386 is operating to rotate the cam 422 in a counterclockwise direction, referring to Fig. 9 it will be appreciated that the input shaft 442 of the transmitter 444 is rotated so that the permanent magnet 452 seen in Fig. 9 is rotated counterclockwise as seen in that figure. Accordingly the indicating element 454 in Fig. 11 has its outer end moved toward the "up" mark.

Reference to Fig. 9 will show that by moving the contact 392 out of engagement with both of the contacts 394 and 396, the motor 386 may at any moment be stopped, the cam 422 will stop turning and the rotor 442 of the transmitter 444 will similarly be stopped. This positioning of contact 392 may be accomplished by placing the flaps lever 376 in Fig. 8 in the "off" position. Accordingly the student may position the flaps at any assumed position and the indicator will at any assumed position and the indicator will not only properly indicate the correct assumed position but the flap valve 464 seen in Fig. 10 will proportionately vent the bellows 72 so that the indicated air speed is proportionately affected. Also the attitude of the fuselage will be proportionately affected through the previously described movements to the transmitter 100 in Fig. 2 and the readings of altimeters and vertical speed indicators are similarly proportionately affected through the same means.

From the above it will be seen that this invention discloses means for simulating, in a grounded aviation trainer, the effects of the lowering and raising of flaps in aircraft when the effect of lowering the flaps is to reduce the air speed of the plane, raise the nose of the plane, and to decrease the rate of descent or to produce a positive rate of ascent, and when the effects of the raising of the flaps are opposite the effects resulting from the lowering of the flaps.

In other types of aircraft the lowering of the flaps results in a decrease in the air speed of the plane, a lowering of the nose of the plane, and an increase in the rate of descent of the plane, or decrease in rate of ascent of the plane. It will be appreciated that the foregoing disclosed apparatus will accomplish these effects by merely eliminating that portion of the apparatus which is provided to rotate the housing 102 of the transmitter 100.

*Means for simulating the operation and effects of retractible landing gear in aircraft*

In the case of aircraft provided with retractible landing gear, the lowering of the landing gear has two effects, viz., reducing the air speed of the aircraft and causing the aircraft to nose downwardly. Vertical speed is, of course, affected. Raising the landing gear causes the plane to return to normal level flight. The following means are provided to simulate, in a grounded aviation trainer, these three effects.

In Fig. 8 it will be seen that the lever 550 is provided, this lever simulating the landing gear control lever of a real airplane. Lever 550 is pivoted about its lower end and is arranged relative to the switch 552 for actuating the same. A slot 554 is placed in the plate 380 to allow fore and aft movement of the lever 550. It will be noted that this lever may be positioned either in the "up" or "down" positions, and that at each end of the slot 554 is a notch 555 in which the lever 550 may be engaged. This lever is spring-biased to force the lever into these notches.

Figure 13:
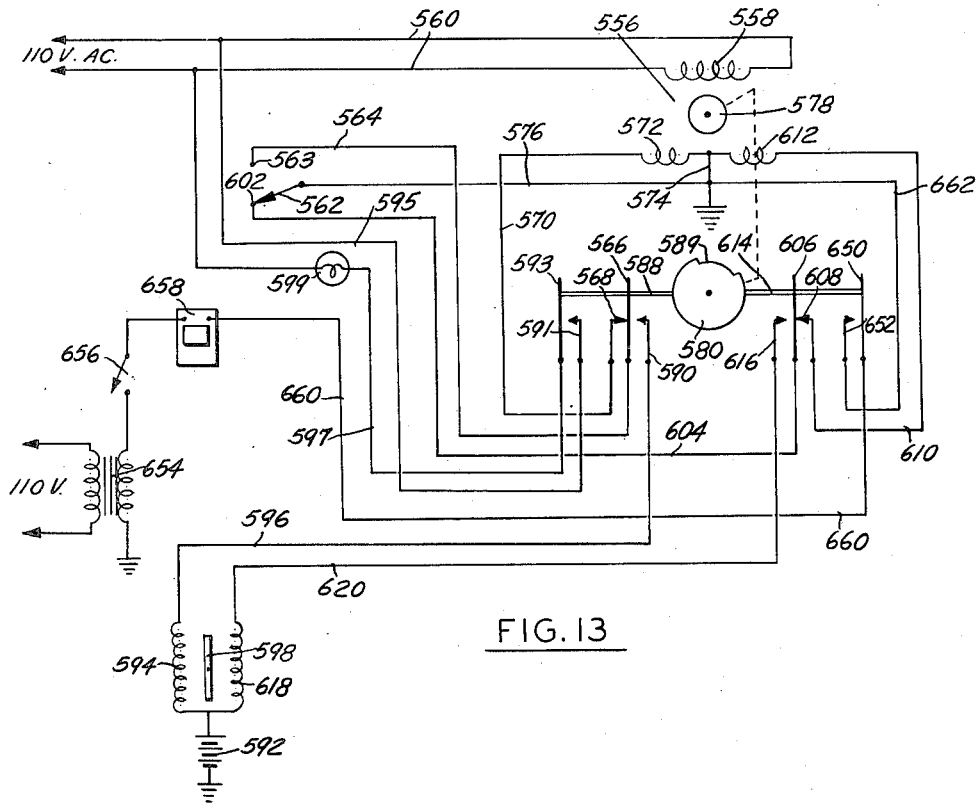
Fig. 13 is an electrical diagram of the landing gear unit.
Figure 14:
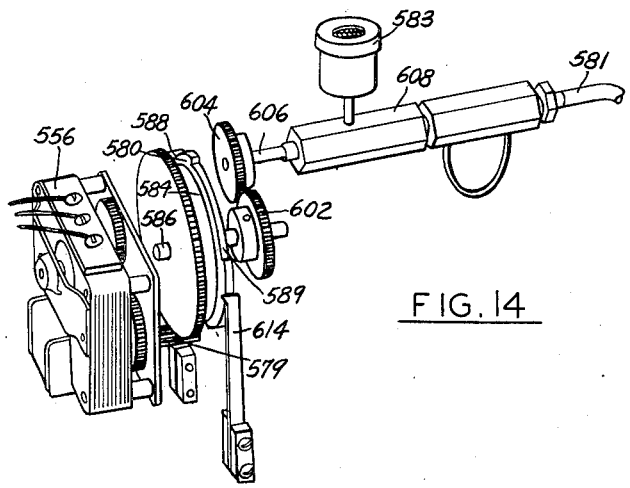
Fig. 14 is a perspective drawing of the mechanical part of the landing gear unit.

Reference is now made to Fig. 13 which discloses the electrical arrangement of the system now being discussed and to Fig. 14 which discloses the mechanical arrangement of this system. It will be seen that a reversible shaded pole follow-up motor 556 is provided, the main coil of this motor being designated 558 and supplied with 110 volts A. C. through the conductors 560. The switch 552 is schematically shown and it will be appreciated that if the landing gear is assumed to be in the "up" position, as is normally the case, and the landing gear control lever 550 is moved to the "down" position, the movable contact 562 engages the contact 563 and the circuit comprising conductor 564, contacts 566, 568, conductor 570, coil 572 and conductors 574, 576 is completed. Accordingly, the rotor 578 of the motor 556 is rotated clockwise as seen in Fig. 13 and the control cam 580 is rotated counter-clockwise. In Fig. 14 it will be seen that the control cam 580 is rotated counterclockwise by the motor 556 through the medium of the output pinion 579, gear 582, insulating member 584 and the shaft 586—gear 582, insulating member 584 and cam 580 all being fixedly mounted upon shaft 586 for rotation therewith. This shaft in turn is rotatably mounted in a suitable frame member.

Referring to Fig. 13, when cam 580 reaches a predetermined counterclockwise position, the spring member 588 will move to the right into the notch 589 and the spring contact 566 will be moved out of engagement with the contact 568. The circuit including coil 572 will thereupon be broken and motor 556 will stop. However, at the same time the spring contact 566 engages the contact 590 and the circuit including the D. C. source 592, coil 594, conductor 596, contact 590, contact 566, conductor 564, contact 562 and conductor 576 which connects with the ground is completed. When the coil 594 is energized, the pivotally mounted permanent magnet 598 is moved into a predetermined position relative to the coil 594.

Referring to Fig. 11, whenever, the coil 594 is energized and the magnet 598 moves into the said predetermined position, a suitable indicating element 600 carried by the magnet 598 is positioned so that when the student looks at the indicator 447, he sees the wheel symbols and thus receives visual intelligence that the landing gear is assumed to be in the "down" position.

Referring again to Fig. 14, it will be seen that upon the outer end of shaft 586 is mounted the spur gear 602 which meshes with the gear 604 affixed upon the stem 606 of the landing gear valve 608, which is connected through the pneumatic line 681 with the line 70 seen in Fig. 2. This valve is constructed in the same manner as the valve shown in Fig. 12 and therefore further description of the same will not be given. It will be appreciated that as the motor 556 runs in order to turn the cam 580 so that the indicator seen in Fig. 11 indicates that the wheels are assumed to be "down," the gears 602 and 604 seen in Fig. 14 are simultaneously rotated and the valve 608 is progressively opened. Referring to Fig. 2, it will be appreciated that as the valve 608 is progressively opened, atmosphere passes through the bleed 583 and into the vacuum line 70 in increasingly larger quantity. Accordingly, the longer the motor 556 runs the more air is introduced into the bellows 72 and the more this bellows will be expanded. As previously explained, the expansion of the bellows 72 will result in a gradual counterclockwise rotation of shafts 78 and 82, and the air speed indicators 92 will be actuated to indicate a progressively lower assumed air speed. At the same time the rotation of shaft 78, through the apparatus shown in Fig. 4 which connects with the elevator valve and with the climb-dive valves, the nose of the fuselage 12 will gradually drop proportional to the assumed decrease in air speed and the altimeters and vertical speed indicators will reflect the assumed descent and rate of descent.

At the same time that the spring contact 588 moves to the right in Fig. 13 to fall into notch 589 to cause the indicator seen in Fig. 11 to show that the landing gear is "down," the contacts 591 are engaged, and the circuit comprising these two contacts, the conductors 595 and 597, and the light 599 is closed, causing the light 599, which is positioned at any suitable point outside fuselage 12, to indicate to the instructor that the landing gear is assumed to be "down."

When the landing gear is assumed to be in the "down" position, and the student desires to simulate the raising of the same, the lever 550 in Fig. 8 will be pushed to the left into the "up" position. This movement of lever 550 causes the movable switch member 562 in Fig. 13 to engage the contact 602 and it will be appreciated that the circuit comprising conductor 604, contacts 606, 608, conductor 610, coil 612 and conductors 574 and 576 will be closed, and the motor 556 will be energized to rotate the armature 578 in the counterclockwise direction. Cam 580 will be rotated clockwise, and as soon as spring contact 588 moves out of the notch 589, the contacts 566 and 590 are opened, coil 594 becomes deenergized, and by means of a suitable positioning element, such as a hair spring, magnet 598 is moved to an intermediate position. In Fig. 11A, this positioning of the magnet will cause the indicating element 600 to be positioned so that the intermediate portion thereof will be visible to the student, and he will know that the wheel positions are being changed. Cam 580 will continue to be rotated clockwise until the spring contact 614 engages the notch 589 in cam 580. At this instant the spring member 614 moves to the left in Fig. 13 and the contact between the members 606 and 608 is broken. Accordingly motor 556 stops. However, the movement to the left of spring contact 614 causes the contact 606 to engage contact 616. This movement completes the circuit comprising the D. C. source 592, coil 618, conductor 620, contacts 616 and 606, conductor 604, contacts 602 and 562, conductor 576 and the ground. Accordingly, coil 618 is energized and the permanent magnet 598 is moved into such a position that the student upon reference to the instrument 448 receives visual intelligence that the landing gear is assumed to be "up."

It will now be appreciated that when the indicator 447 indicates that the wheels are "up," and the landing gear control lever is moved into the "down" position, as soon as the cam 580 in Fig. 13 is moved counterclockwise so that spring contact 614 moves out of notch 589, contacts 606 and 616 are opened, coil 618 is deenergized, and the mentioned hair spring moves magnet 598 to its center position, so the indicating element 600 indicates the wheel positions are being changed.

Inasmuch as the coils 594 and 618, magnet 598 and indicating element 600 may be of the standard aircraft type, a further explanation of the same is not deemed necessary.

At the same time that the motor 556 is energized to rotate its armature 578 in the counterclockwise direction, which rotation causes the cam 580 to rotate clockwise, it will be appreciated that the landing gear valve 608 seen in Fig. 14 is gradually closed. The gradual closing of this valve results in a gradual shutting off of the passage of air through the valve into the line 70 which connects the air speed regulator valve 48 with the bellows 72. Accordingly, the bellows 72 is progressively contracted as the running of the motor gradually closes the valve 608. The assumed air speed as indicated by indicators 92 is gradually increased, and also through the operation of the transmitter 100 which controls the elevator valve and the climb-dive valves, the nose of the fuselage 12 is gradually raised to its normal flight position and the altimeters and vertical speed indicators are gradually affected to reflect normal flight conditions.

Reference is again made to Fig. 13 where it will be appreciated that when the landing gear is assumed to be in the "up" position and the indicator shown in Fig. 11 so indicates, the spring contact 614 will be engaged in the notch 589 in cam 580 and consequently the spring contact 650 will engage the contact 652. Accordingly, it will be appreciated that the circuit comprising the transformer 654, switch 656, signalling buzzer 658, conductor 660, contacts 650 and 652, conductor 662 and ground will be closed. The switch 656 is placed within fuselage 12 and is arranged to be closed by the simulated throttle lever whenever the lever is positioned to the rear of a predetermined point. Accordingly, whenever the previously disclosed apparatus indicates to the student that the landing gear is assumed to be up, if the student then retards the throttle beyond a predetermined point, as is customary in the landing of actual aircraft, the switch 656 will be closed and the buzzer 658 will warn the student that he is about to land with the landing gear in the "up" position. It will be appreciated by those skilled in the art that the buzzer 658 signals to the student under the same conditions as the buzzer in a real airplane signals to the pilot thereof—namely, whenever the throttle lever is retarded beyond a predetermined point and the landing gear is in the "up" position. When the student hears the signal from the buzzer he may avoid a "landing" with the landing gear in the raised position in the same manner that he would do in piloting an actual aircraft. If the assumed situation is such that he has sufficient time to simulate the lowering of the landing gear before reaching the assumed landing field, he may do so. Otherwise he will have to manipulate the fuselage 12 in such a manner as to simulate circling the landing field, during which time he will perform the necessary steps to place the landing gear in an assumed "down" position.

In view of the preceding disclosure it will be appreciated that this application discloses means for use in grounded aviation trainers whereby the operation and effects of flaps and landing gear in actual aircraft may be simulated. As will be evident to those skilled in the art, this invention may be used in other types of trainers than those disclosed herein, and that numerous changes in the form of the invention may be made without departing from the spirit thereof. All such uses and variations are intended to be covered by the following claims.

I claim:

1. In a grounded aviation trainer of the type comprising a fuselage pivotally mounted upon a universal joint for simulating the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a flaps indicator in said fuselage simulating the flaps indicator of a real plane and a manually operable control in said fuselage simulating the flaps position control of a real plane, means interconnecting said manually operable control and said flaps indicator for changing the indication of said flaps indicator, and means interconnecting said manually operable control and said air speed indicator for changing the indication of said air speed indicator in accordance with the changing indication of said flaps indicator.

2. In a grounded aviation trainer of the type comprising a fuselage pivotally mounted upon a universal joint for simulating the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a flaps indicator in said fuselage simulating the flaps indicator of a real plane and a manually operable control in said fuselage simulating the flaps position control of a real plane, a reversible motor controlled by the position of said manually operable control, and means interconnecting said flaps indicator and said air speed indicator with said motor for controlling the indications of both of said indicators by the operation of said motor.

3. In a grounded aviation trainer of the type comprising a fuselage pivotally mounted upon a universal joint for simulating the climbing and diving movements of a plane in actual flight, the combination of an air speed indicator and a vertical speed indicator in said fuselage for respectively indicating the assumed air speed and the assumed vertical speed of said fuselage, a lever in said fuselage simulating the throttle control lever of a real plane, means interconnecting said lever and each of said indicators and means responsive to the pitching movement of said fuselage connected to each of said indicators for causing said indicators to respectively indicate an assumed air speed and an assumed vertical speed dependent upon the combined position of said lever and pitching attitude of said fuselage, a flaps indicator in said fuselage simulating the flaps indicator of a real plane and a manually operable control in said fuselage simulating the flaps position control of a real plane, means interconnecting said manually operable control and said flaps indicator for changing the indication of said flaps indicator, and means interconnecting said manually operable control with said air speed indicator and said vertical speed indicator for changing the reading of said last two mentioned indicators in accordance with the changing indications of said flaps indicator.

4. In a grounded aviation trainer of the type comprising a fuselage pivotally mounted upon a universal joint for simulating the climbing and diving movements of a plane in actual flight, the combination of an air speed indicator and a vertical speed indicator in said fuselage for respectively indicating the assumed air speed and the assumed vertical speed of said fuselage, a lever in said fuselage simulating the throttle control lever of a real plane, means interconnecting said lever and each of said indicators and means responsive to the pitching movement of said fuselage connected to each of said indicators for causing said indicators to respectively indicate an assumed air speed and an assumed vertical speed dependent upon the combined position of said lever and pitching attitude of said fuselage, a flaps indicator in said fuselage simulating the flaps indicator of a real plane and a manually operable control in said fuselage simulating the flaps position control of a real plane, a reversible motor controlled by the position of said manually operable control, and means interconnecting said flaps indicator, said air speed indicator and said vertical speed indicator with said motor for controlling the indications of all three of said indicators by the operation of said motor.

5. In a grounded aviation trainer of the type comprising a fuselage pivotally mounted upon a universal joint and having pitching means for changing the pitching position of said fuselage to simulate the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a flaps indicator in said fuselage simulating the flaps indicator of a real plane and a manually operable control in said fuselage simulating the flaps position control of a real plane, means interconnecting said manually operable control and said flaps indicator for changing the indication of said flaps indicator, means interconnecting said manually operable control and said air speed indicator for changing the reading of said air speed indicator in accordance with the changing indication of said flaps indicator, and means interconnecting said manually operable control and said fuselage pitching means for changing the pitching position of said fuselage in accordance with the changing indication of said flaps indicator.

6. In a grounded aviation trainer of the type comprising a fuselage pivotally mounted upon a universal joint and having pitching means for changing the pitching position of said fuselage to simulate the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a flaps indicator in said fuselage simulating the flaps indicator of a real plane and a manually operable control in said fuselage simulating the flaps position control of a real plane, a reversible motor controlled by the position of said manually operable control, means interconnecting said motor with said flaps indicator and said air speed indicator for changing the indications of said air speed indicator and said flaps indicator in accordance with the operation of said motor, and means interconnecting said motor with said fuselage pitching means for changing the pitching attitude of said fuselage in accordance with the running of said motor.

7. In a grounded aviation trainer of the type comprising a fuselage pivotally mounted upon a universal joint and having a valve for controlling pitching means for changing the pitching position of said fuselage to simulate the climbing and diving movements of a plane in actual flight, the combination of an air speed indicator and a vertical speed indicator in said fuselage for respectively indicating the assumed air speed and assumed vertical speed of said fuselage, a lever in said fuselage simulating the throttle control lever of a real plane, means interconnecting said lever and each of said indicators and means responsive to the pitching movement of said fuselage connected to each of said indicators for causing said indicators to respectively indicate an assumed air speed and an assumed vertical speed dependent upon the combined position of said lever and pitching attitude of said fuselage, a flaps indicator in said fuselage simulating the flaps indicator of a real plane and a manually operable control in said fuselage simulating the flaps position control of a real plane, a reversible motor controlled by the position of said manually operable control, means interconnecting said flaps indicator, said air speed indicator and said vertical speed indicator with said motor for controlling the indications of each of said indicators by the operation of said motor, and means interconnecting said motor and said valve for operating said valve to change the pitching position of said fuselage in accordance with the operation of said motor.

8. In a grounded aviation trainer of the type comprising a fuselage having an instrument panel for viewing by a student, the combination of an air speed indicator upon said panel for indicating the assumed air speed of said fuselage, a lever in said fuselage simulating the throttle control lever of a real plane, a fluid line and means interconnecting said lever and said line for varying the pressure in said line by movements of said lever, a connection between said line and said indicator for causing said indicator to indicate an assumed air speed dependent upon the pressure in said line, a flaps indicator upon said panel simulating the flaps indicator of a real plane and a manually operable control in said fuselage simulating the flaps position control of a real plane, a reversible motor controlled by the position of said manually operable control, a valve and a connection from said valve to said fluid line for changing the pressure within said line by an operation of said valve, means interconnecting said motor and said flaps indicator for controlling the indication of said flaps indicator in accordance with the operation of said motor, and means interconnecting said motor and said valve for operating said valve in accordance with the operation of said motor.

9. In a grounded aviation trainer of the type comprising a fuselage pivotally mounted upon a universal joint for simulating the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a landing gear indicator in said fuselage simulating the landing gear indicator of a real plane and a manually operable control in said fuselage simulating the landing gear control of a real plane, means interconnecting said manually operable control and said landing gear indicator for changing the indication of said landing gear indicator, and means interconnecting said manually operable control and said air speed indicator for changing the indication of said air speed indicator in accordance with the changing indication of said landing gear indicator.

10. In a grounded aviation trainer of the type comprising a fuselage pivotally mounted upon a universal joint for simulating the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a landing gear indicator in said fuselage simulating the landing gear indicator of a real plane and a manually operable control in said fuselage simulating the landing gear control of a real plane, a reversible motor controlled by the position of said manually operable control, and means interconnecting said landing gear indicator and said air speed indicator with said motor for controlling the indications of both of said indicators by the operation of said motor.

11. In a grounded aviation trainer of the type comprising a fuselage pivotally mounted upon a universal joint for simulating the climbing and diving movements of a plane in actual flight, the combination of an air speed indicator and a vertical speed indicator in said fuselage for respectively indicating the assumed air speed and the assumed vertical speed of said fuselage, a lever in said fuselage simulating the throttle control lever of a real plane, means interconnecting said lever and each of said indicators and means responsive to the pitching movement of said fuselage connected to each of said indicators for causing said indicators to respectively indicate an assumed air speed and an assumed vertical speed dependent upon the combined position of said lever and pitching attitude of said fuselage, a landing gear indicator in said fuselage simulating the landing gear indicator of a real plane and a manually operable control in said fuselage simulating the landing gear control of a real plane, means interconnecting said manually operable control and said landing gear indicator for changing the indication of said landing gear indicator, and means interconnecting said manually operable control with said air speed indicator and said vertical speed indicator for changing the reading of said last two mentioned indicators in accordance with the changing indications of said landing gear indicator.

12. In a grounded aviation trainer of the type comprising a fuselage pivotally mounted upon a universal joint for simulating the climbing and diving movements of a plane in actual flight, the combination of an air speed indicator and a vertical speed indicator in said fuselage for respectively indicating the assumed air speed and the assumed vertical speed of said fuselage, a lever in said fuselage simulating the throttle control lever of a real plane, means interconnecting said lever and each of said indicators and means responsive to the pitching movement of said fuselage connected to each of said indicators for causing said indicators to respectively indicate an assumed air speed and an assumed vertical speed dependent upon the combined position of said lever and pitching attitude of said fuselage, a landing gear indicator in said fuselage simulating the landing gear indicator of a real plane and a manually operable control in said fuselage simulating the landing gear control of a real plane, a reversible motor controlled by the position of said manually operable control, and means interconnecting said landing gear indicator, said air speed indicator and said vertical speed indicator with said motor for controlling the indications of all three of said indicators by the operation of said motor.

13. In a grounded aviation trainer of the type comprising a fuselage pivotally mounted upon a universal joint and having pitching means for changing the pitching position of said fuselage to simulate the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a landing gear indicator in said fuselage simulating the landing gear indicator of a real plane and a manually operable control in said fuselage simulating the landing gear control of a real plane, means interconnecting said manually operable control and said landing gear indicator for changing the indication of said landing gear indicator, means interconnecting said manually operable control and said air speed indicator for changing the reading of said air speed indicator in accordance with the changing indication of said landing gear indicator, and means interconnecting said manually operable control and said fuselage pitching means for changing the pitching position of said fuselage in accordance with the changing indication of said landing gear indicator.

14. In a grounded aviation trainer of the type comprising a fuselage pivotally mounted upon a universal joint and having pitching means for changing the pitching position of said fuselage to simulate the climbing and diving movements of a plane in actual flight, the combination of an air speed indicator in said fuselage for indicating the assumed air speed of said fuselage, a lever in said fuselage simulating the throttle control lever of a real plane, means interconnecting said lever and said indicator and means responsive to the pitching movements of said fuselage connected to said indicator for causing said indicator to indicate an assumed air speed dependent upon the combined position of said lever and pitching attitude of said fuselage, a landing gear indicator in said fuselage simulating the landing gear indicator of a real plane and a manually operable control in said fuselage simulating the landing gear control of a real plane, a reversible motor controlled by the position of said manually operable control, means interconnecting said motor with said landing gear indicator and with said air speed indicator for changing the indications of said air speed indicator and said landing gear indicator in accordance with the operation of said motor, and means interconnecting said motor with said fuselage pitching means for changing the pitching attitude of said fuselage in accordance with the running of said motor.

15. In a grounded aviation trainer of the type comprising a fuselage pivotally mounted upon a universal joint and having a valve for controlling pitching means for changing the pitching position of said fuselage to simulate the climbing and diving movements of a plane in actual flight, the combination of an air speed indicator and a vertical speed indicator in said fuselage for respectively indicating the assumed air speed and assumed vertical speed of said fuselage, a lever in said fuselage simulating the throttle control lever of a real plane, means interconnecting said lever and each of said indicators and means responsive to the pitching movement of said fuselage connected to each of said indicators for causing said indicators to respectively indicate an assumed air speed and an assumed vertical speed dependent upon the combined position of said lever and pitching attitude of said fuselage, a landing gear indicator in said fuselage simulating the landing gear indicator of a real plane and a manually operable control in said fuselage simulating the landing gear control of a real plane, a reversible motor controlled by the position of said manually operable control, means interconnecting said landing gear indicator, said air speed indicator and said vertical speed indicator with said motor for controlling the indications of each of said indicators by the operation of said motor, and means interconnecting said motor and said valve for operating said valve to change the pitching position of said fuselage in accordance with the operation of said motor.

16. In a grounded aviation trainer of the type comprising a fuselage having an instrument panel for viewing by a student, the combination of an air speed indicator upon said panel for indicating the assumed air speed of said fuselage, a lever in said fuselage simulating the throttle control lever of a real plane, a fluid line and means interconnecting said lever and said line for varying the pressure in said line by movements of said lever, a connection between said line and said indicator for causing said indicator to indicate an assumed air speed dependent upon the pressure in said line, a landing gear indicator upon said panel simulating the landing gear indicator of a real plane and a manually operable control in said fuselage simulating the landing gear control of a real plane, a reversible motor controlled by the position of said manually operable control, a valve and a connection from said valve to said fluid line for changing the pressure within said line by an operation of said valve, means interconnecting said motor and said landing gear indicator for controlling the indication of said landing gear indicator in accordance with the operation of said motor, and means interconnecting said motor and said valve for operating said valve in accordance with the running of said motor.

KARL A. KAIL.

REFERENCES CITED

The following references are of record in the file of this patent:

UNITED STATES PATENTS

| Number | Name | Date |
|---|---|---|
| 2,099,857 | Link, Jr. | Nov. 23, 1937 |